United States Patent
Sheng et al.

(10) Patent No.: US 11,990,842 B2
(45) Date of Patent: May 21, 2024

(54) METHOD AND SYSTEM FOR BALANCING MULTI-PHASE LLC POWER CONVERTER WITH SWITCH-CONTROLLED CAPACITORS

(71) Applicant: MAGNA INTERNATIONAL INC., Aurora (CA)

(72) Inventors: Bo Sheng, Kingston (CA); Xiang Zhou, Kingston (CA); Wenbo Liu, Kingston (CA); Yang Chen, Kingston (CA); Yan-Fei Liu, Kingston (CA); Andrew Yurek, Kingston (CA); Lakshmi Varaha Iyer, Troy, MI (US); Gerd Schlager, Kefermarkt (AT); Michael Neudorfhofer, Sankt Valentin (AT); Wolfgang Baeck, Sankt Valentin (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 241 days.

(21) Appl. No.: 17/425,621

(22) PCT Filed: Jan. 24, 2020

(86) PCT No.: PCT/US2020/014937
§ 371 (c)(1),
(2) Date: Jul. 23, 2021

(87) PCT Pub. No.: WO2020/154588
PCT Pub. Date: Jul. 30, 2020

(65) Prior Publication Data
US 2022/0103081 A1    Mar. 31, 2022

Related U.S. Application Data

(60) Provisional application No. 62/796,555, filed on Jan. 24, 2019, provisional application No. 62/796,547, filed on Jan. 24, 2019.

(51) Int. Cl.
*H02M 3/335* (2006.01)
*B60L 53/20* (2019.01)
*H02M 1/00* (2006.01)

(52) U.S. Cl.
CPC ......... *H02M 3/33576* (2013.01); *B60L 53/20* (2019.02); *H02M 1/0058* (2021.05); *B60L 2210/10* (2013.01)

(58) Field of Classification Search
CPC ........... H02M 3/33576; H02M 1/0058; H02M 3/335; H02M 1/0048; B60L 53/30; B60L 2210/10
See application file for complete search history.

(56) References Cited

U.S. PATENT DOCUMENTS 6,205,035 B1   3/2001  Vollmer et al.
9,293,284 B1   3/2016  Romas et al.
(Continued)

OTHER PUBLICATIONS

Biela, Juergen, et al.; Impact of Power Density Maximization on Efficiency of DC-DC Converter Systems; ETH Eidgenossische Technische Hochschule Zuricl-Swiss Federal Institute of Technology Zurich; HPE Laboratory for High Power Electronic Systems; IEEE Transactions on Power Electronics; 14 pgs.—cover sheet and pp. 288-300; vol. 24, No. 1; Jan. 2009.

*Primary Examiner* — Adolf D Berhane
(74) *Attorney, Agent, or Firm* — Dickinson Wright PLLC

(57) ABSTRACT

A multi-phase LLC power converter comprises a plurality of LLC phases each including a resonant tank and a switching stage. The resonant tank includes a resonant inductor, a resonant capacitor, and a parallel inductance. The switching stage switches an input power at an operating frequency to apply a switched power to the resonant tank, with the switched power approximating an alternating current (AC) waveform having a switching frequency. A secondary-side controller varies the switching frequency to control an (Continued)

output voltage of the multi-phase LLC power converter. A primary-side controller measures primary-side currents, calculates an initial switch-controlled capacitor (SCC) conduction phase angle for each of the LLC phases, and operates an SCC switch in accordance with an SCC conduction phase angle to adjust the capacitance of the resonant capacitor of an LLC phase to cause each of the LLC phases to have equal resonant frequencies.

13 Claims, 16 Drawing Sheets

(56) References Cited

U.S. PATENT DOCUMENTS

| | | | |
|---|---|---|---|
| 9,729,070 B2 | 8/2017 | Liu et al. | |
| 9,780,678 B2 | 10/2017 | Adragna et al. | |
| 9,847,710 B2 | 12/2017 | Lee et al. | |
| 11,362,585 B2 * | 6/2022 | Rizzolatti | H02M 1/0048 |

* cited by examiner

METHOD AND SYSTEM FOR BALANCING MULTI-PHASE LLC POWER CONVERTER WITH SWITCH-CONTROLLED CAPACITORS

CROSS REFERENCE TO RELATED APPLICATIONS

This U.S. National Stage Patent Application claims the benefit of PCT International Patent Application Serial No. PCT/US2020/014937 filed Jan. 24, 2020 entitled "METHOD AND SYSTEM FOR BALANCING MULTI-PHASE LLC POWER CONVERTER WITH SWITCH-CONTROLLED CAPACITORS" which claims the benefit of U.S. Provisional Patent Application No. 62/796,547, filed Jan. 24, 2019, and U.S. Provisional Patent Application No. 62/796,555, filed Jan. 24, 2019, the contents of which are incorporated herein by reference in their entirety.

FIELD

The present disclosure relates generally to multi-phase inductor-inductor-capacitor (LLC) type power converters, and more specifically to LLC power converters for use as a low-voltage DC-DC converter (LDC) in an electric vehicle (EV).

BACKGROUND

With advancements of power conversion technology and power electronics devices, high efficiency and high power density become a major challenge for front-end DC/DC converters. LLC resonant converter has been widely accepted in recent years by providing both high efficiency and high power density for numerous applications, such as, servers, flat panel TVs, and LED lighting. However, LLC converters can experience problems producing high output currents. One source of difficulty is high conduction loss caused by high root mean square (RMS) current on the secondary side. Furthermore, fringe and approximate effects of transformers may become severe in high current applications.

To operate an LLC converter in high-power high-current applications, interleaving techniques can be used. With interleaving, total output current can be split between two or more different interleaved LLC phases, each operating at the same switching frequency and out of phase with one another to reduce current ripple. Thus, the $I^2R$ loss will be reduced to $I^2R/N$, where N is the number of the interleaved phases. However, when interleaved, LLC converter will work at the same switching frequency. Due to component tolerances, voltage gains of different LLC phases are different at the same switching frequency, which can cause current unbalance in an interleaved multi-phase LLC converter.

SUMMARY

The present disclosure provides a multi-phase LLC power converter comprising a plurality of LLC phases, with each of the LLC phases including a resonant tank and a switching stage. The resonant tank includes a resonant inductor, a resonant capacitor, and a parallel inductance. The switching stage is configured to switch an input power at an operating frequency to apply a switched power to the resonant tank, the switched power approximating an alternating current (AC) waveform having a switching frequency. A secondary-side controller is configured to vary the switching frequency to control an output voltage of the multi-phase LLC power converter. A primary-side controller is configured to calculate an initial switch-controlled capacitor (SCC) conduction phase angle for each of the LLC phases to cause each of the LLC phases to have equal resonant frequencies; and to operate an SCC switch in accordance with an associated one of the SCC conduction phase angles to adjust the capacitance of the resonant capacitor of at least one of the plurality of LLC phases.

The present disclosure also provides a method of operating a multi-phase LLC power converter comprising: switching an input power at a switching frequency by a switching stage of each of a plurality of LLC phases to apply a switched power to a resonant tank having a resonant inductor, a resonant capacitor, and a parallel inductance, the switched power approximating an alternating current (AC) waveform having a switching frequency; varying the switching frequency to control an output voltage of the multi-phase LLC power converter; calculating a switch-controlled capacitor (SCC) conduction phase angle for each of the LLC phases to cause each of the LLC phases to have equal resonant frequencies; and adjusting a capacitance of the resonant capacitor of at least one of the plurality of LLC phases by operating an SCC switch in accordance with an associated one of the SCC conduction phase angles.

BRIEF DESCRIPTION OF THE DRAWINGS

Further details, features and advantages of designs of the invention result from the following description of embodiment examples in reference to the associated drawings.

DETAILED DESCRIPTION

Figure 1:
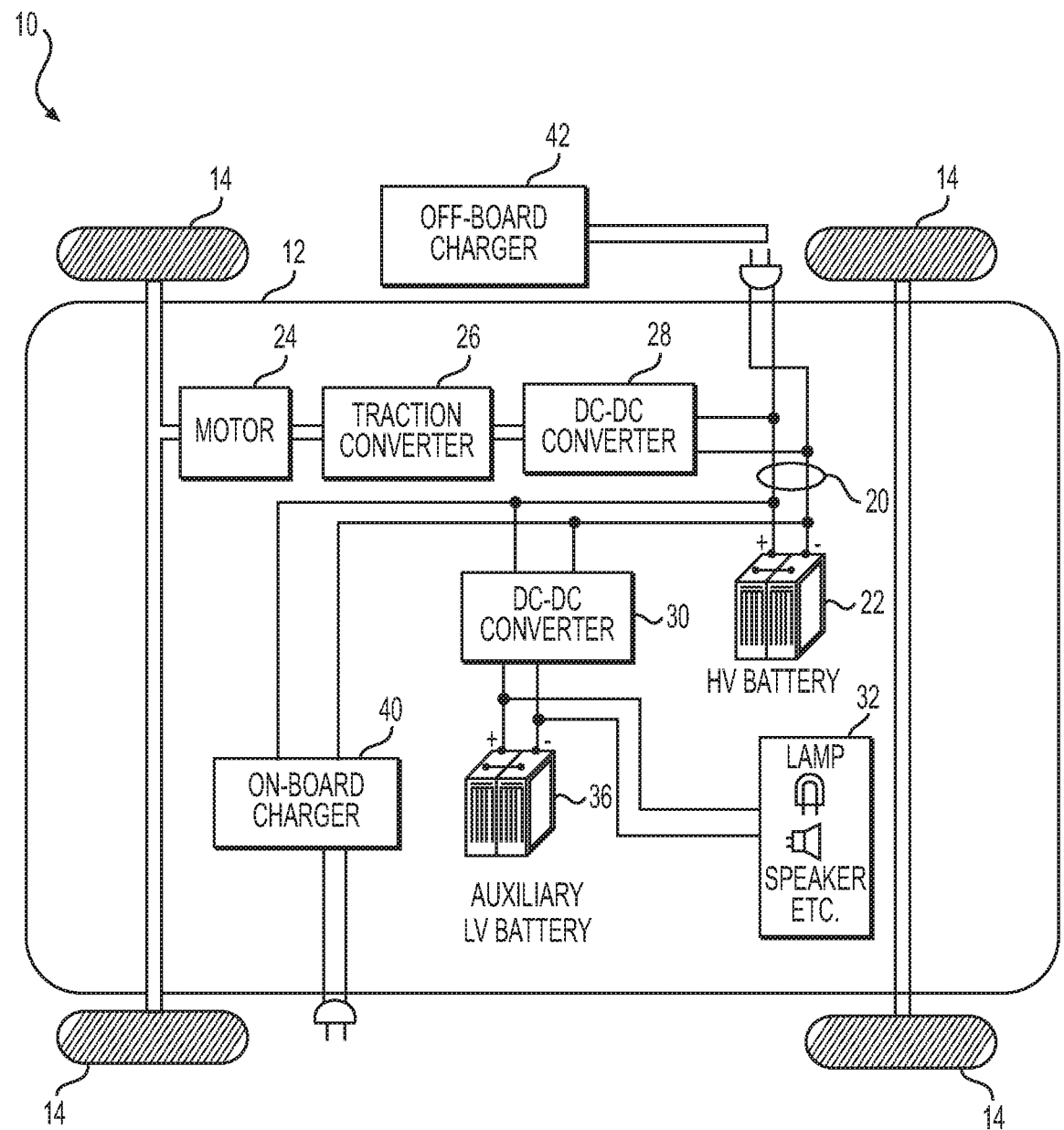
FIG. 1 is a schematic block diagram of a power distribution system of a motor vehicle.

Referring to the drawings, the present invention will be described in detail in view of following embodiments.

FIG. 1 shows a schematic block diagram of a power distribution system 10 of a motor vehicle 12 having a plurality of wheels 14. The power distribution system 10 includes a high-voltage (HV) bus 20 connected to a HV battery 22 for supplying power to a motor 24, which is configured to drive one or more of the wheels 14. The HV bus 20 may have a nominal voltage that is 250 VDC-430 VDC, although other voltages may be used. The motor 24 is supplied with power via a traction converter 26, such as a variable-frequency alternating current (AC) drive, and a high-voltage DC-DC converter 28. The high-voltage DC-DC converter 28 supplies the traction converter 26 with filtered and/or regulated DC power having a voltage that may be greater than, less than, or equal to the DC voltage of the HV bus 20. A low-voltage DC-DC converter (LDC) 30 is connected to the HV bus 20 and is configured to supply low-voltage (LV) power to one or more LV loads 32 via a LV bus 34. The LDC 30 may be rated for 1-3 kW, although the power rating may be higher or lower. The LV loads 32 may include, for example, lighting devices, audio devices, etc. The LDC 30 may be configured to supply the low-voltage loads 32 with DC power having a voltage of, for example, 9-16 VDC, although other voltages may be used. An auxiliary LV battery 36 is connected to the LV bus 34. The auxiliary LV battery 36 may be a lead-acid battery, such as those used in conventional vehicle power systems. The auxiliary LV battery 36 may supply the LV loads 32 with power when the LDC 30 is unavailable. Alternatively or additionally, the auxiliary LV battery 36 may provide supplemental power to the LV loads 32 in excess of the output of the LDC 30. For example, the auxiliary LV battery 36 may supply a large inrush current to a starter motor that exceeds the output of the LDC 30. The auxiliary LV battery 36 may stabilize and/or regulate the voltage on the LV bus 34. An onboard charger 40 and/or an off-board charger 42 supply HV power to the HV bus 20 for charging the HV battery 22.

Figure 2:
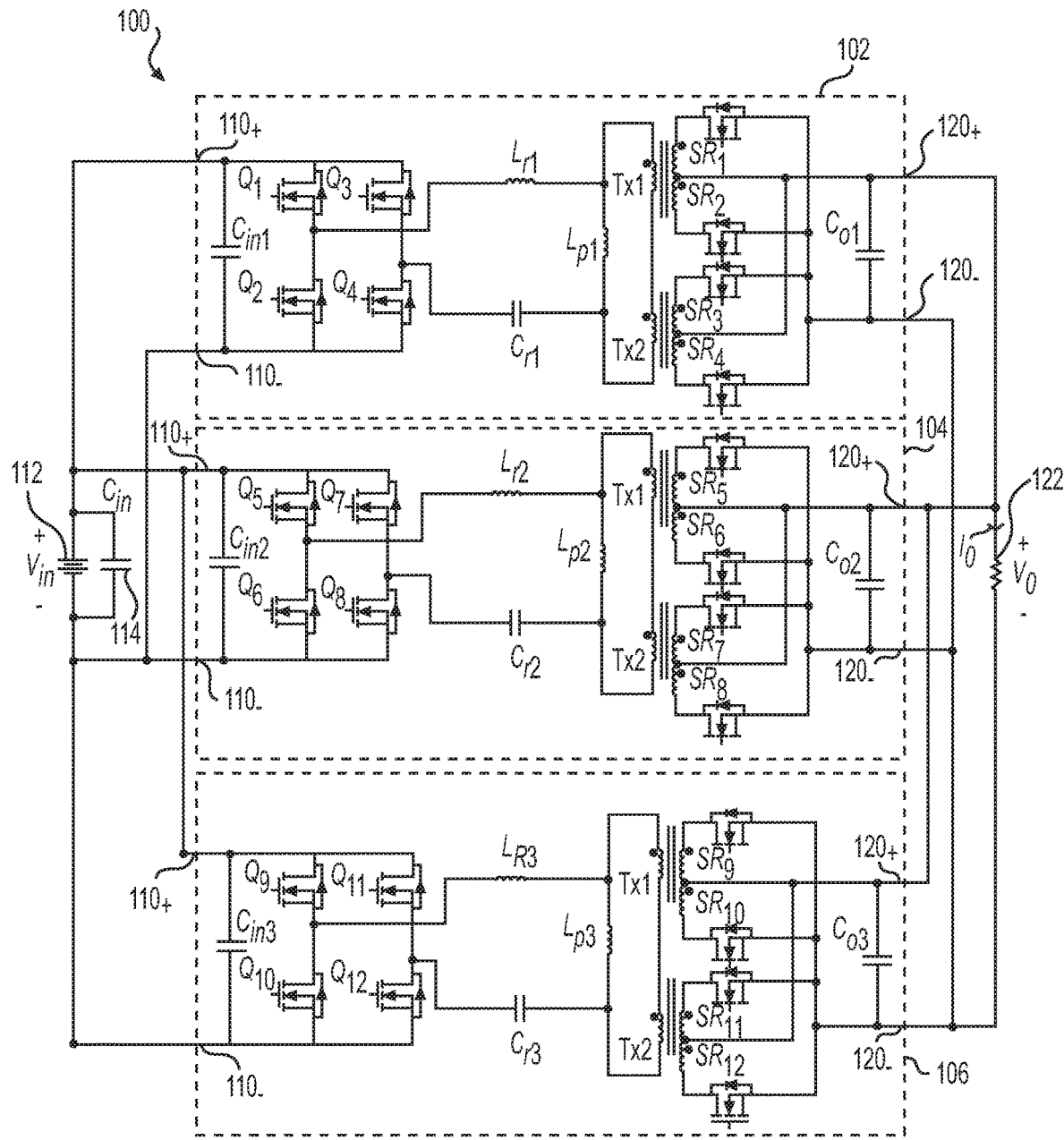
FIG. 2 is a schematic diagram of a multi-phase LLC power converter in accordance with some embodiments of the present disclosure.

FIG. 2 is a schematic diagram of a multi-phase LLC power converter 100 in accordance with some embodiments of the present disclosure. The multi-phase LLC power converter 100 shown in FIG. 2 includes three single-phase LLC power converters 102, 104, 106, also called LLC phases, each connected in parallel with one another, and which share a common design. The multi-phase LLC power converter 100 may have a different number of single-phase LLC phases 102, 104, 106, and the number of LLC phases 102, 104, 106 may depend on design requirements of the multi-phase LLC power converter 100. Each of the single-phase LLC phases 102, 104, 106 defines an input bus $110_+$, $110_-$ for receiving an input power having a DC voltage. The input busses $110_+$, $110_-$ of each of the LLC phases 102, 104, 106 are connected in parallel with one another and to a DC voltage supply 112, such as a battery, having an input voltage $V_{in}$. An input capacitor 114, such as a noise filter, having a capacitance $C_{in}$ is connected in parallel with the DC voltage supply 112. Each of the LLC phases 102, 104, 106 defines an output bus $120_+$, $120_-$ having a positive terminal $120_+$ and a negative terminal $120_-$ for conducting an output power having a DC output voltage $V_o$ to a load 122. The output busses $120_+$, $120_-$ of each of the LLC phases 102, 104, 106 are connected in parallel with one another and to the load 122.

In some embodiments, the multi-phase LLC power converter 100 may be used as a low-voltage DC-DC converter (LDC) configured to supply an output voltage of 9.0 to 16.0 VDC from an input having a voltage of 250-430 VDC. In some embodiments, the multi-phase LLC power converter 100 may have a peak efficiency of at least 96.7%. In some embodiments, the multi-phase LLC power converter 100 may have a full-load efficiency of at least 96.2%. In some embodiments, the multi-phase LLC power converter 100 may have a power density of at least about 3 kW/L.

Figure 3:
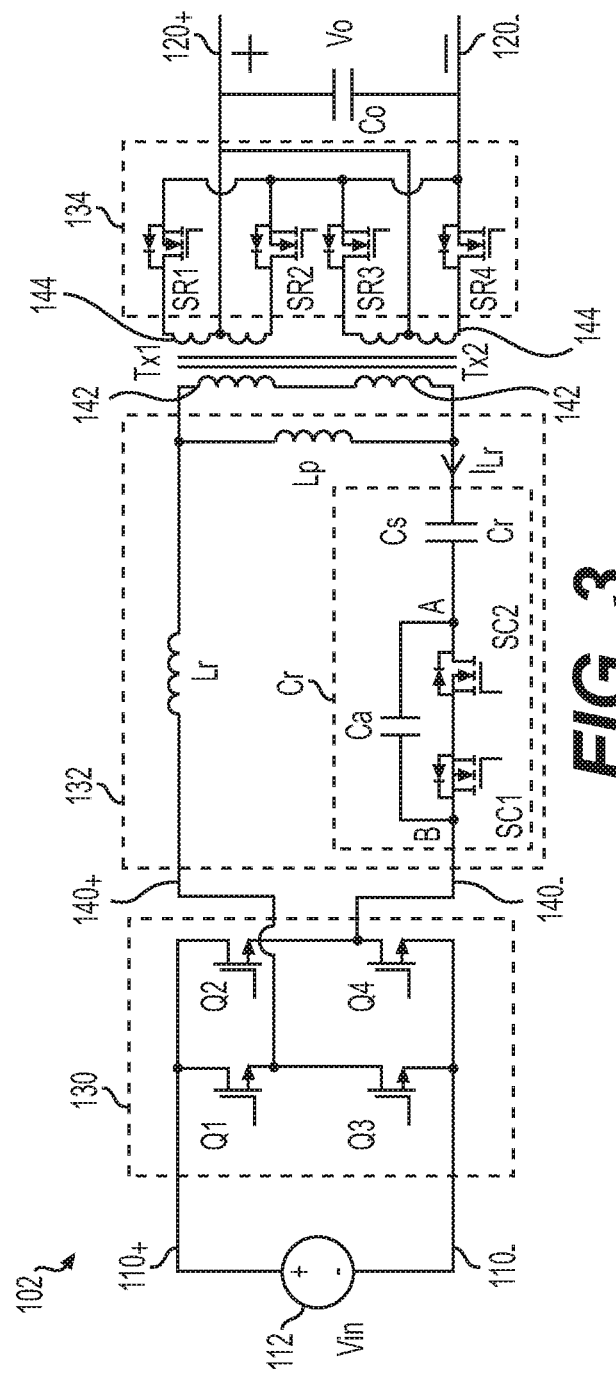
FIG. 3 is a schematic diagram of a single-phase LLC power converter in accordance with some embodiments of the present disclosure.

FIG. 3 is a schematic diagram of an example first LLC phase 102 in accordance with some embodiments of the present disclosure. The example first LLC phase 102 shown in FIG. 3 may have a construction similar or identical to any one of the LLC phases 102, 104, 106 of the multi-phase LLC power converter 100, which may be identical to one another, with the exception of differences resulting from manufacturing tolerances.

The example first LLC phase 102 shown in FIG. 3 includes a switching stage 130, a resonant tank 132, a set of transformers Tx1, Tx2, and a rectification stage 134. The switching stage 130 includes four high-speed switches Q1, Q2, Q3, Q4, with each of the high-speed switches being a Gallium Nitride (GaN) high-electron-mobility transistor (HEMT) configured to switch the input power to generate a switched power upon a switched power bus $140_+$, $140_-$, the switched power having an approximately sinusoidal (i.e. AC) waveform defining a switching frequency $f_{sw}$, which may also be called an AC frequency or an AC switching frequency. In some embodiments, the switching frequency exceeds 300 kHz. In some embodiments, the switching frequency $f_{sw}$ may be varied between 260 and 400 kHz. In some other embodiments, the switching frequency $f_{sw}$ may be varied between 260 and 380 kHz. In some embodiments, the high-speed switches Q1, Q2, Q3, Q4, may be switched at an operating frequency range of between 260 and 380 kHz.

Each of the four high-speed switches Q1, Q2, Q3, Q4 is configured to switch current from a corresponding one of a positive conductor $110_+$ or a negative conductor $110_-$ of the input bus $110_+$, $110_-$ to a corresponding one of a positive conductor $140_+$ or a negative conductor $140_-$ of the switched power bus $140_+$, $140_-$. The switching stage 130 may have a different arrangement which may include fewer than or greater than the four high-speed switches Q1, Q2, Q3, Q4, shown in the example LLC phase 102 shown in FIG. 3. Each of the LLC phases 102, 104, 106 within the multi-phase LLC power converter 100 may have an equal switching frequency, and the AC waveforms of each of the LLC phases 102, 104, 106 may be in phase with one another. Alternatively, the AC waveforms of each of the LLC phases 102, 104, 106 may be out of phase from one another for interleaving the phases and producing a smoother output power than if the LLC phases 102, 104, 106 had AC waveforms that were in phase with one another.

The resonant tank 132 includes a resonant inductor Lr, a resonant capacitor Cr, and a parallel inductance Lp all connected in series with one another between the switched power bus 140₊, 140₋. The transformers Tx1, Tx2 each include a primary winding 142, with the primary windings 142 of the transformers Tx1, Tx2 connected in series with one-another, and with the series combination of the primary windings 142 connected in parallel with the parallel inductance Lp. The parallel inductance Lp may include a stand alone inductor device. Alternatively or additionally, the parallel inductance Lp may include inductance effects, such as a magnetizing inductance, of the primary windings 142 of the transformers Tx1, Tx2. Each of the transformers Tx1, Tx2 has a secondary winding 144 with a center tap connected directly to the positive terminal 120₊ of the output bus 120₊, 120₋. The ends of the secondary windings 144 of the transformers Tx1, Tx2 are each connected to the negative terminal 120₋ of the output bus 120₊, 120₋ via a rectifier SR1, SR2, SR3, SR4 in the rectification stage 134. One or more of the rectifiers SR1, SR2, SR3, SR4 may take the form of a switch, such as a field effect transistor (FET), operated as a synchronous rectifier, as shown in FIG. 3. Alternatively or additionally, one or more of the rectifiers may be formed from one or more different types of switches, such as junction transistors and/or other devices including, for example, one or more rectification diodes. Each of the LLC phases 102, 104, 106 may include a different number of transformers Tx1, Tx2, which may be fewer than or greater than the two transformers Tx1, Tx2 shown in the example design depicted in the FIGS.

Figure 4:
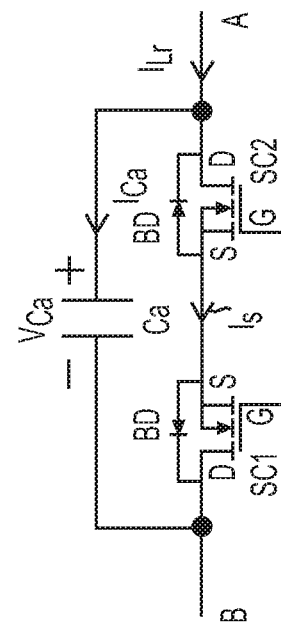
FIG. 4 is an enlarged portion of FIG. 3.

Still referring to FIG. 3, the resonant capacitor Cr is configured as a switch-controlled capacitor (SCC), which comprises a series capacitor Cs connected in series with a switched capacitor Ca. FIG. 4 is an enlarged portion of FIG. 3, showing details of the SCC portion of the resonant capacitor Cr. A set of SCC switches SC1, SC2 are connected in parallel with the switched capacitor Ca for selectively allowing current to bypass the switched capacitor Ca. The SCC switches SC1, SC2 each metal-oxide-semiconductor field-effect transistor (MOSFET) devices, each having a drain D, a source S, and a gate G terminal and defining a body diode BD. The example SCC is configured as a full-wave SCC, capable of selectively switching currents having either of two opposite polarities. Specifically, the SCC switches SC1, SC2 in the example SCC are arranged with their respective sources S being coupled together. Different arrangements of the SCC are possible, and the SCC may be configured as a half-wave device. The example SCC is configured to selectively bypass the switched capacitor Ca, varying the equivalent resonant capacitance Cr up to a maximum capacitance which is equal to the capacitance of the series capacitor Cs. In other words, the SCC resonant capacitor Cr can be controlled to reduce the equivalent resonant capacitance Cr, and to thereby increase the resonant frequency of the resonant tank 132.

Operation Review of Full-Wave SCC

Figure 5:
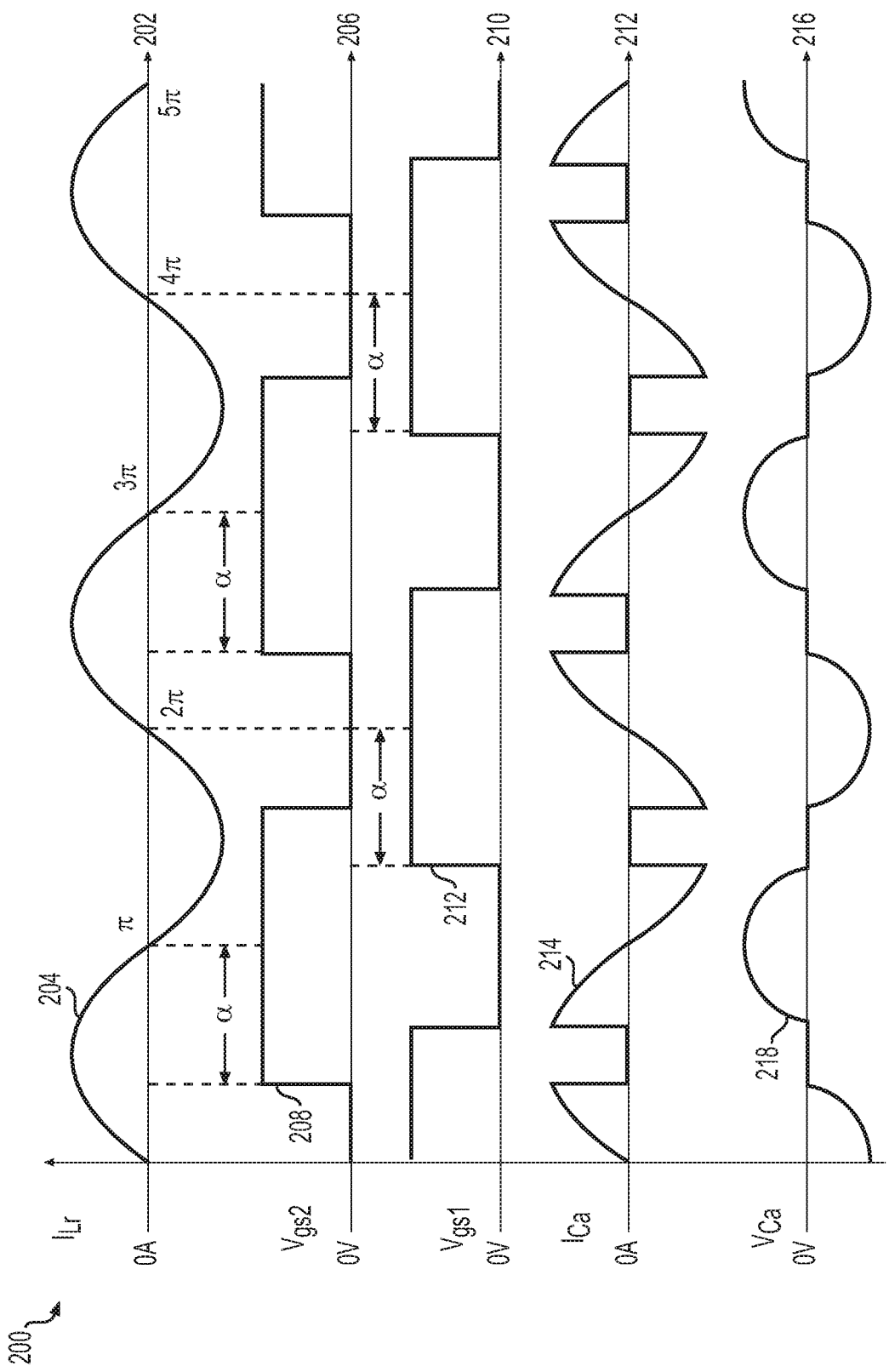
FIG. 5 is a graph showing plots of voltages and currents in an LLC power converter over a common time scale in accordance with some embodiments of the present disclosure.

FIG. 4 shows the structure of a full-wave SCC, which includes the switched capacitor Ca in parallel with the two MOSFETs SC1, SC2. FIG. 5 is a graph 200 showing plots of voltages and currents in an LLC power converter over a common time scale. Graph 200 includes plot 202 having line 204 of current $I_{Lr}$, plot 206 having line 208 of gate voltage $V_{gs2}$ of SCC switch SC2, and plot 210 having line 212 of gate voltage $V_{gs1}$ of SCC switch SC1. The gate voltages $V_{gs1}$, $V_{gs2}$ are driven between a high, or asserted state to cause the corresponding SCC switch SC1, SC2 to be in a conductive state (which may also be called "on"), and a low, or de-asserted state to cause the corresponding SCC switch SC1, SC2 to be in a non-conductive state (which may also be called "off"). Graph 200 also includes plot 212 having line 214 of current $I_{Ca}$ into the switched capacitor Ca, and plot 216 having line 218 of voltage $V_{Ca}$ across the switched capacitor Ca.

Referring now to FIG. 5, and assuming a sinusoidal current $I_{Lr}$ is flowing through the SCC, the current zero-crossing points are at angle 0, π, 2π, . . . etc. For a positive half cycle, SC1 is turned off at angle 2nπ+α. After SC1 is turned off, the current flows from A to B via $C_a$ and charges the capacitor until the next current zero-crossing point at (2n+1)π. Then, the current reverse direction, and begins to discharge capacitor $C_a$. After capacitor Ca is fully discharged, the negative current is about to flow from B to A via the body diode BD of SC1. To prevent its body diode BD from carrying current, SC1 is turned on again. It remains on for the rest of cycle and turns off again at angle (2n+2)π+α. Following the same procedure, SC2 controls the negative half cycle.

It is noted from FIG. 5 that both SC1 and SC2 are switched on and off under zero-voltage switching (ZVS) conditions. Moreover, based on the driving scheme, MOSFETs' body didoes BD are prevented from carrying current, resulting in further efficiency improvement. The equivalent capacitance of SCC, $C_{SC}$ is modulated by angle α and is expressed in equation (1), below. Thus, the equivalent resonant capacitance is derived in equation (2), below. Substitute (1) into (2), the equivalent resonant capacitance can be rewritten in equation (3), below.

$$C_{SC} = \frac{C_a}{2 - (2\alpha - \sin(2\alpha))/\pi} \quad (1)$$

$$C_r = \frac{C_{sc} C_s}{C_{sc} + C_s} \quad (2)$$

$$C_r = \frac{2\pi C_a C_s}{2\pi(C_a + C_s) - 2\alpha C_s + \sin(2\alpha) C_s} \quad (3)$$

The angle α is varied from π/2 to π, which corresponds to the minimum and maximum resonant capacitance $C_{SC}$, respectively. In other words, the duty cycle of the SCC switches SC1, SC2 can be varied between 50% and 100%. When α=π/2, current $I_{Lr}$ will flow through capacitor $C_a$ and bypass SCC switches SC1 and SC2. Therefore, the equivalent resonant capacitance is at the minimum value which is equal to $C_s$ and $C_a$ connected in series. When α=π, current $I_{Lr}$ will flow through SCC MOSFETs SC1 and SC2 and bypass capacitor $C_a$, which makes the equivalent resonant capacitance toward to its maximum value $C_s$. In short, the SCC is described in the present disclosure to reduce the equivalent resonant capacitance of one or more of the LLC phases 102, 104, 106. Alternatively or additionally, SCC may be used to increase the equivalent resonant capacitance of one or more of the LLC phases 102, 104, 106.

Load Sharing Characteristic

Due to components' tolerances, the resonant frequencies of interleaved phases are slightly different, which can cause different voltage gains at a given switching frequency. Therefore, the output current for each phase will also be different. Based on time domain analysis, the voltage gain of full bridge LLC resonant converter in boost mode can be derived in equation (4), below. Definitions of terms of equation (4) are given in equation set (5), where ωs is the switching frequency $f_{sw}$ in radians per second.

$$\frac{V_o}{V_{in}} = -\frac{2}{n} \frac{1}{\frac{Z_o \omega_o}{4n^2 f_{sw} R}(\cos\beta - 1) + \frac{\pi Z_1}{2L_m \omega_o}\sin\beta - (\cos\beta + 1)} \quad (4)$$

$$Z_o = \sqrt{\frac{L_r}{C_s}} \quad Z_1 = \sqrt{\frac{L_r + L_m}{C_s}} \quad \omega_o = \frac{1}{\sqrt{L_r C_s}} \quad (5)$$

$$\omega_1 = \frac{1}{\sqrt{(L_r + L_m)C_s}} \quad \beta = \pi\omega_1\left(\frac{1}{2\pi f_{sw}} - \frac{1}{\omega_o}\right) \quad (6)$$

Figure 7:
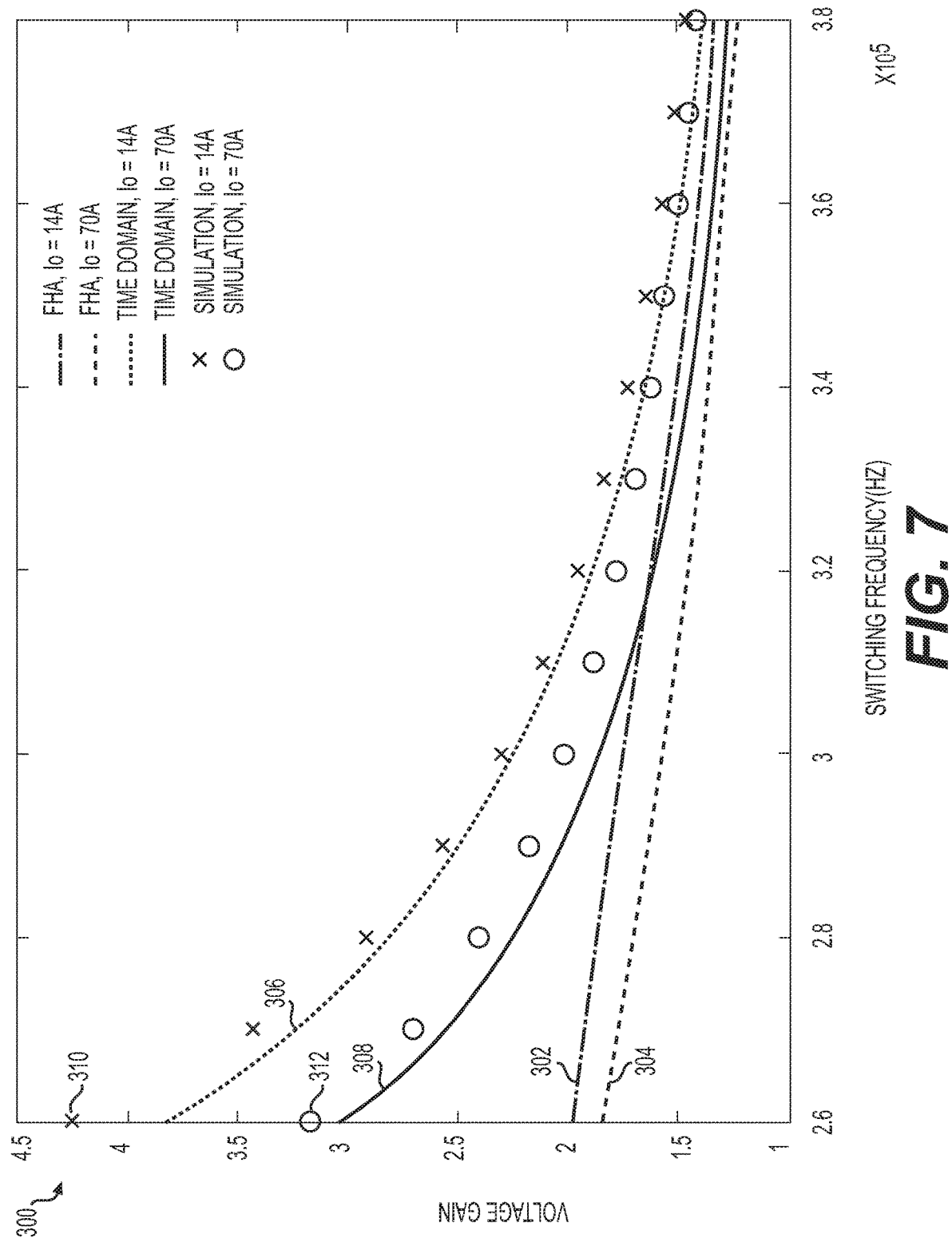
FIG. 7 is a graph showing plots of voltage gain vs. switching frequency of an LLC power converter in accordance with some embodiments of the present disclosure.

FIG. 7 is a graph 300 of voltage conversion ratios (i.e. voltage gains) of the LLC power converter 100 versus switching frequency $f_{sw}$ at different load conditions. Specifically, FIG. 7 includes plots 302 and 304 showing voltage gain vs. switching frequency $f_{sw}$ for the LLC power converter 100 calculated using a first harmonic approximation (FHA) method with output current Io=14 A, and Io=70 A, respectively. FIG. 7 also includes plots 306 and 308 showing voltage gains vs. switching frequency $f_{sw}$ for the LLC power converter 100 calculated using a time domain method with output current Io=14 A, and Io=70 A, respectively. FIG. 7 also includes plots 310 and 312 showing simulations of voltage gains vs. switching frequency $f_{sw}$ for the LLC power converter 100 with output current Io=14 A, and Io=70 A, respectively. The specifications of the converter are shown in Table. I. As shown in FIG. 7, the voltage gain achieved using time domain method is more accurate than that of first harmonic approximation (FHA) method. For accuracy purpose, load sharing characteristic is analyzed using the time domain method in the following part.

TABLE I

SPECIFICATIONS OF ONE PHASE LLC CONVERTER

| $V_{in}$ | 250-430 VDC | $L_r$ | 25 μH |
|---|---|---|---|
| $V_{out}$ | 14 VDC | $L_p$ | 125 μH |
| $P_{out}/I_{out}$ | 1300 W/90 A | $C_s$ | 3.4 nF |
| n | 44:1:1 | $f_{sw}$ | 260-380 KHz |

The expression of output current can be calculated from equation (4), and is shown in equation (6), below, where $L_m$, $Z_o$, $Z_1$, and $\omega_o$ are dummy variables, as their physical parameters are determined after the subject LLC converter is built.

$$I_o = \frac{4n^2 f_{sw} V_o}{Z_o \omega_o (\cos\beta - 1)}\left(\cos\beta + 1 - \frac{2V_{in}}{nV_o} - \frac{\pi Z_1}{2L_m \omega_o}\sin\beta\right) \quad (6)$$

$$a = \frac{L_r}{L_{r0}} \quad b = \frac{L_m}{L_{m0}} \quad C = \frac{C_s}{C_{s0}} \quad (7)$$

Taking resonant component tolerances into consideration, the relationship between actual and ideal component values of $L_r$, $L_m$ and $C_s$ are defined in equation (7). Where, $L_{r0}$, $L_{m0}$ and $C_{s0}$ represent the ideal values without tolerances. Substituting (7) into (6), the output current can be expressed as a function of a, b, and c, shown in equation (8). Where, $\beta_0$ is defined in equation (9).

$$I_o = \quad (8)$$
$$\frac{4cn^2 f_{sw} V_o C_{s0}}{(\cos\beta_0 - 1)}\left(\cos\beta_0 + 1 - \frac{2V_{in}}{nV_o} - \frac{\pi}{2}\sqrt{\frac{1}{bL_{m0}}\left(\frac{1}{aL_{r0}} + \frac{1}{bL_{m0}}\right)}\sin\beta_0\right)$$

$$\beta_0 = \pi \frac{1}{\sqrt{(aL_{r0} + bL_{m0})cC_{s0}}}\left(\frac{1}{2\pi f_{sw}} - \frac{1}{\sqrt{acL_{r0}C_{s0}}}\right) \quad (9)$$

Figure 8:
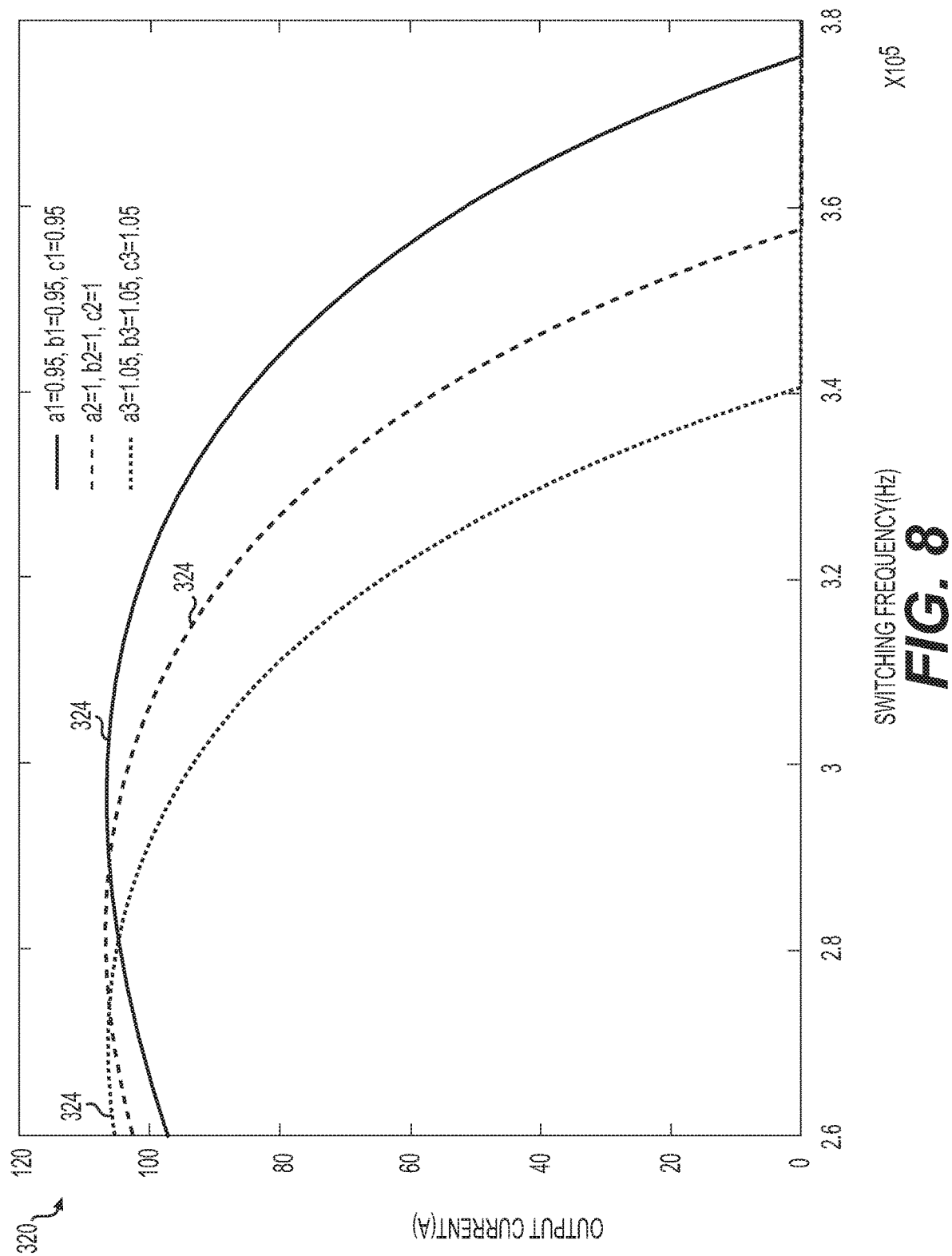
FIG. 8 is a graph showing plots of output current vs. switching frequency of an LLC power converter in accordance with some embodiments of the present disclosure.

FIG. 8 is a graph 320 showing plots 322, 324, and 326 of output current vs. switching frequency $f_{sw}$ of an LLC power converter 100 in accordance with some embodiments of the present disclosure. FIG. 8 shows the output current versus switching frequency $f_{sw}$ curves of three-phase LLC converter at 400V input, 14V output. In this example, ±5% tolerances are assumed for resonant components including Lr, Lm, and Cs. Plot 322 illustrates the LLC power converter where a1=0.95, a2=0.95, and a3=0.95. In other words, plot 322 shows output of one of the LLC phases 102, 104, 106 in which each of Lr, Lm, and Cs are set to 0.95 of nominal value. Plot 324 illustrates the LLC power converter where a1=1.00, a2=1.00, and a3=1.00. In other words, plot 324 shows output of one of the LLC phases 102, 104, 106 in which each of Lr, Lm, and Cs are set to 1.00 of nominal value. Plot 326 illustrates the LLC power converter where a1=1.05, a2=1.05, and a3=1.05. In other words, plot 326 shows output of one of the LLC phases 102, 104, 106 in which each of Lr, Lm, and Cs are set to 1.05 of nominal value. As mentioned before, when LLC converters are connected in parallel, they should be run at same switching frequency. From FIG. 8, at 340 KHz, the output currents of three phases are 90 A, 55 A and 0 A, respectively. Thus, the effects of component tolerances can adversely affect the ability perform current sharing between different ones of the LLC phases 102, 104, 106.

By adjusting angle α, SCC can be used to compensate the component tolerances, helping achieve current sharing. After adding SCC into LLC converter, the output current Io, as set forth in equation (8) can be rewritten in equation (10), where $C_{r0}$ and $\beta_0$ are given in equations (11) and (12), respectively. With a good SCC compensation, the output currents of three phases should be the same. Thus, the relationship specified in equation (13) could be derived.

$$I_o(f_{sw}, a, b, c, \alpha) = \quad (10)$$
$$\frac{4n^2 f_{sw} C_{r0} V_o}{\cos\beta_0 - 1}\left(\cos\beta_0 + 1 - \frac{2V_{in}}{nV_o} - \frac{\pi}{2}\sqrt{\frac{1}{bL_{m0}}\left(\frac{1}{aL_{r0}} + \frac{1}{bL_{m0}}\right)}\sin\beta_0\right)$$

$$C_{r0} = \frac{2c\pi C_a C_{s0}}{2\pi(C_a + cC_{s0}) - 2\alpha c C_{s0} + \sin(2\alpha)cC_{s0}} \quad (11)$$

$$\beta_0 = \pi \frac{1}{\sqrt{(aL_{r0} + bL_{m0})C_{r0}}}\left(\frac{1}{2\pi f_{sw}} - \frac{1}{\sqrt{aL_{r0}C_{r0}}}\right) \quad (12)$$

$$I_{o\_1}(f_{sw}, a_1, b_1, c_1, \alpha_1) = \quad (13)$$
$$I_{o\_2}(f_{sw}, a_2, b_2, c_2, \alpha_2) = I_{o\_3}(f_{sw}, a_3, b_3, c_3, \alpha_3) = \frac{I_{o\_total}}{3}$$

$$I_{o\_1}(f_{sw}, 0.95, 0.95, 0.95, \pi) = \quad (14)$$
$$I_{o\_2}(f_{sw}, 1, 1, 1, \alpha_2) = I_{o\_3}(f_{sw}, 1.05, 1.05, 1.05, \alpha_3) = \frac{I_{o\_total}}{3}$$

As described above, the provided SCC can only decrease the equivalent resonant capacitance and increase the resonant frequency. Therefore, the highest resonant frequency phase among three phases will become the reference phase.

It is also named as first phase. The angle α of that phase will be kept at π. Still considering ±5% component tolerances, equation (14) can be calculated.

Figure 9:
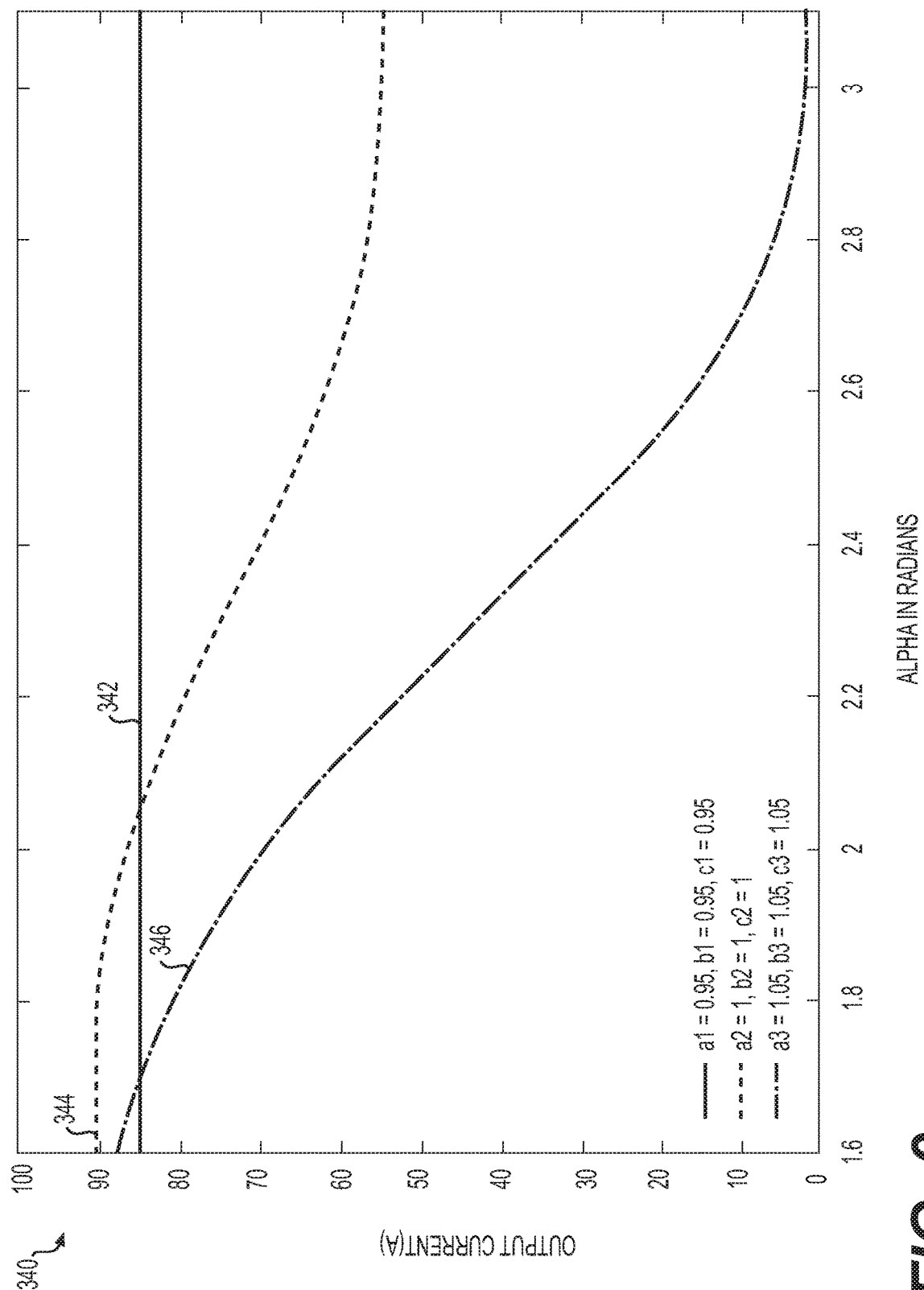
FIG. 9 is a graph showing plots of output current vs. SCC conduction phase angle of an LLC power converter in accordance with some embodiments of the present disclosure.

Based on equations (10), (11), (12) and (14), the required α2 and α3 to achieve current sharing can be derived at specific switching frequency $f_{sw}$ and output current condition. FIG. 9 is a graph 340 showing plots 342, 344, 346 of output current vs. SCC conduction phase angle of an LLC power converter 100 in accordance with some embodiments of the present disclosure. FIG. 9 shows the relationship of output current versus angle α at 400V input, 14V output and switching frequency $f_{sw}$ of 340 KHz. Plot 342 illustrates the LLC power converter where a1=0.95, a2=0.95, and a3=0.95. In other words, plot 342 shows output of one of the LLC phases 102, 104, 106 in which each of Lr, Lm, and Cs are set to 0.95 of nominal value. Plot 344 illustrates the LLC power converter where a1=1.00, a2=1.00, and a3=1.00. In other words, plot 344 shows output of one of the LLC phases 102, 104, 106 in which each of Lr, Lm, and Cs are set to 1.00 of nominal value. Plot 346 illustrates the LLC power converter where a1=1.05, a2=1.05, and a3=1.05. In other words, plot 346 shows output of one of the LLC phases 102, 104, 106 in which each of Lr, Lm, and Cs are set to 1.05 of nominal value. From FIG. 9, the reference phase could provide 85 A output current at the testing condition. Moreover, the intersections in FIG. 9 indicate that α2 and α3 of second phase and third phase should be decreased to 2.1 and 1.7, respectively, to output equal amounts of current.

Adaptive Control Strategy and Digital Implementation

Figure 6:
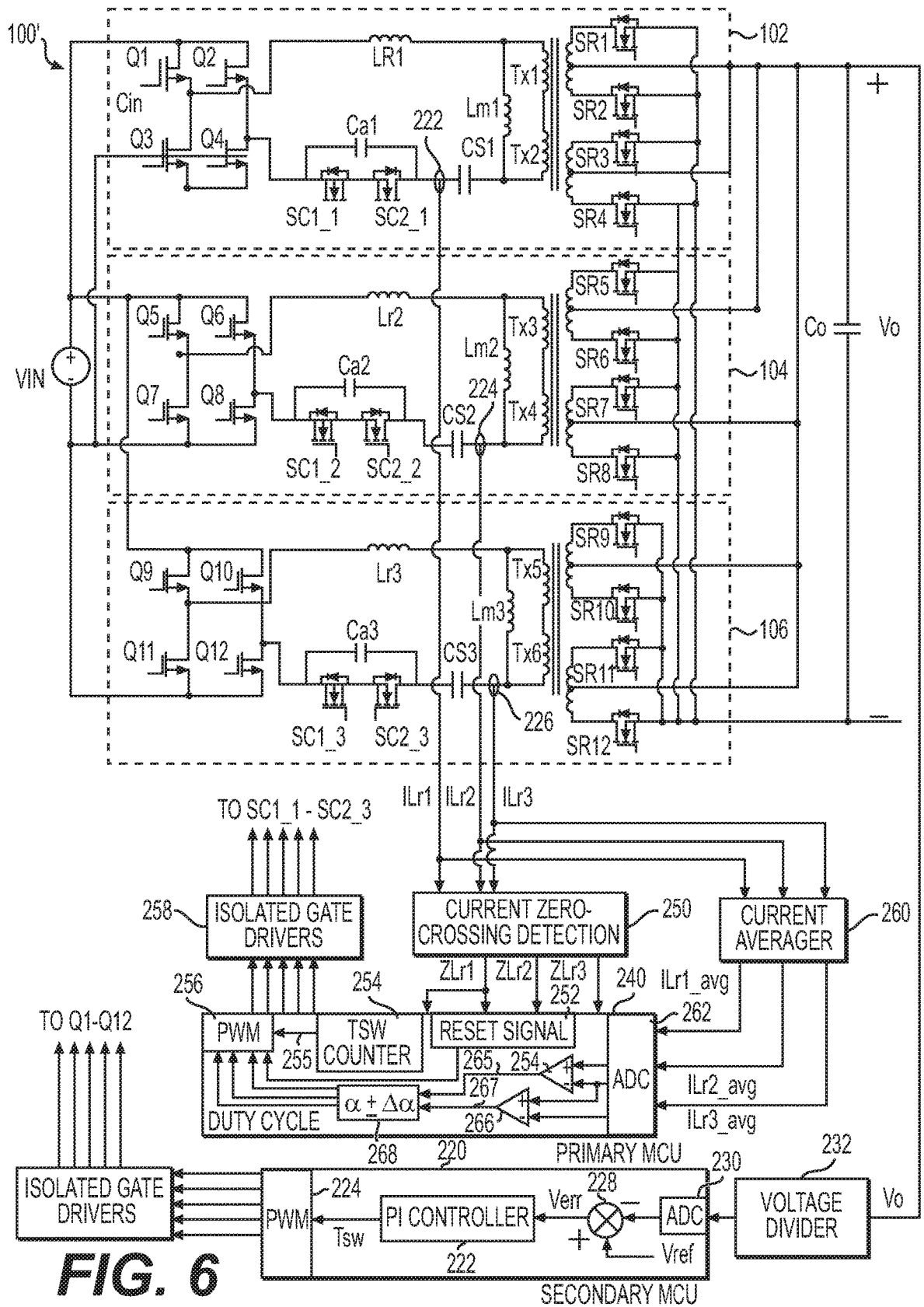
FIG. 6 is a schematic and block diagram of a multi-phase LLC power converter in accordance with some embodiments of the present disclosure.

Two Microchip DSCs dsPIC33FJ32GS610 type microcontrollers (MCU) are used to implement the proposed control scheme. The hardware and firmware implementations for three-phase SCC-LLC converter is shown in FIG. 6. The control loops include a fast voltage loop for output voltage regulation and a slow current loop configured for current sharing.

FIG. 6 is a schematic and block diagram of a multi-phase LLC power converter 100' in accordance with some embodiments of the present disclosure. Specifically, the example multi-phase LLC power converter 100' includes a secondary-side controller 220, also called a secondary MCU, configured to control the high-speed switches Q1-Q12 of the LLC phases 102, 104, 106 to control the output voltage Vo of the multi phase LLC power converter 100'. The operation of the secondary-side controller 220 to control the output voltage Vo of the multi-phase LLC power converter 100' may be called a "voltage loop".

Specifically, the secondary-side controller 220 is configured to vary the switching frequency $f_{sw}$ of the AC waveform produced by the high-speed switches Q1-Q12 of the LLC phases 102, 104, 106 in order to control the output voltage Vo of the multi-phase LLC power converter 100'. In particular, the secondary-side controller 220 includes a proportional-integral (PI) controller 222 and a pulse width modulator (PWM) 224. The PI controller 222 is configured to generate a control signal Tsw that is applied to the PWM 224 and then to the high-speed switches Q1-Q12 via isolated gate drivers 226. The PI controller 222 takes a voltage error signal Verr as an input, where the voltage error signal Verr is proportional to the difference between the output voltage Vo and a reference voltage Vref. The voltage error signal Verr is generated using a difference block 228 and an analog-to-digital converter (ADC) 230 of the secondary-side controller 220, with the ADC 230 monitoring the output voltage Vo via a voltage divider 232. To avoid oscillation, the current loop may operate much slower than the voltage loop.

The example multi-phase LLC power converter 100' shown in FIG. 6 also includes a primary-side controller 240, also called a primary MCU, which is configured to control a current loop. The primary-side controller 240 may be a separate device from the secondary-side controller 220 as shown in FIG. 6. Alternatively, functions of the primary-side controller 240 and the secondary-side controller 220 may be performed by a common device or a distributed controller distributed amongst two or more different physical controllers.

The primary-side controller 240 is configured to determine resonant frequencies of each of the LLC phases 102, 104, 106; calculate an initial switch-controlled capacitor (SCC) conduction phase angle α for each of the LLC phases 102, 104, 106 to cause each of the LLC phases 102, 104, 106 to have equal resonant frequencies; and operate each of the SCC switches SC1_1-SC2_3 in accordance with the associated SCC conduction phase angle α to adjust the capacitance of the resonant capacitor Cr of each of the LLC phases 102, 104, 106. Determining the resonant frequencies of each of the LLC phases 102, 104, 106 may include, for example, measuring and processing one or more values indicative of the resonant frequencies, such as primary-side current $I_{Lr}$ in one or more of the LLC phases 102, 104, 106.

Still referring to FIG. 6, a current sensor 242, 244, 246 is configured to monitor the primary-side current $I_{Lr}$ in each of the LLC phases 102, 104, 106, respectively, and to generate a corresponding current signal ILr1, ILr2, ILr3. Each of the current sensors 242, 244, 246 may include a current transformer and/or other device or devices for measuring the primary-side currents $I_{Lr}$. A zero-crossing detector 250 monitors and compares the current signals ILr1, ILr2, ILr3 with a zero reference to generate corresponding zero-crossing signals ZLr1, ZLr2, ZLr3. A reset signal generator 252 generates a reset signal 253 based upon the zero-crossing signals ILr1, ZLr2, ZLr3. A frequency counter 254 generates a frequency signal 255 using a first one of the zero-crossing signals ZLr1, ZLr2, ZLr3. An SCC pulse width modulator (PWM) 256 controls operation of the SCC switches SC1_1-SC2_3 via an SCC gate driver 258 using the frequency signal 255 and the reset signal 253.

A current average calculator 260 generates averaged current signals ILr1_avg, ILr2_avg, ILr3_avg using the current signals ILr1, ILr2, ILr3 and supplies the averaged current signals ILr1_avg, ILr2_avg, ILr3_avg to an analog-to-digital converter (ADC) 262 of the primary-side controller 240. A first comparator 264 is configured to compare the averaged first current ILr1_avg with the averaged second current ILr2_avg and to assert a first comparison signal 265 if ILr1_avg>ILr2_avg. A second comparator 266 is configured to compare the averaged first current ILr1_avg with the averaged third current ILr3_avg and to assert a second comparison signal 267 if ILr1_avg>ILr3_avg. A phase angle adjuster 268 receives the first and second comparison signals 265, 267 and adjusts the SCC conduction phase angle α by a predetermined adjustment amount Δα in response thereto. The predetermined adjustment amount Δα may be 0.1°, although the predetermined adjustment amount Δα may be greater than or less than 0.1°.

An adaptive hysteresis comparison control scheme may implemented in the primary-side controller 240 to adjust the SCC conduction phase angle α. If one phase current is larger than another phase current for a time in excess of a first timing threshold or a second timing threshold, the corresponding angle α will be updated. By doing so, the current loop could become slower. The first and second timing thresholds may be determined and/or represented by numbers N1 and N2 of periodic events, such as iterations of a control loop, respectively. Moreover, unexpected noise on current sensing could be filtered out. Each SCC PWM signal is synchronized with the zero-crossing points of the primary-side current $I_{Lr}$ of the corresponding LLC phase 102, 104, 106. Moreover, each SCC PWM signal is symmetrical with the zero-crossing point of the corresponding primary-side current $I_{Lr}$. Thus, the body diodes BD can automatically be prevented from carrying current. The zero-crossing detection is implemented using the current sensors 242, 244, 246 and a comparator such as the zero-crossing detector 250. To update SCC conduction phase angle α value for different operation conditions, switching frequency $f_{sw}$ information is required by primary-side controller 240. Thus, the frequency counter 254 is implemented in the primary-side controller 240. The adaptive hysteresis comparison control method is shown in a flowchart on FIG. 14.

In some embodiments, and as illustrated graphically in FIG. 5, operating the SCC switches SC1, SC2 in accordance with the associated SCC conduction phase angle α includes driving each of the SCC switches SC1_1-SC2_3 to a conductive state for a period of time symmetrical about a zero-crossing of the primary-side current $I_{Lr}$ in the corresponding LLC phase 102, 104, 106. In other words, each of the SCC switches SC1_1-SC2_3 are turned on for an equal duration before and after a corresponding zero-crossing of the primary-side current $I_{Lr}$.

Table II presents a summary comparison of a proposed LDC in accordance with the present disclosure compared with eight different other reference DC-DC converter designs. As shown in Table. I, the proposed LDC achieves high efficiency and high power-density compared with other LDCs.

TABLE III

SPECIFICATIONS AND PARAMETERS
OF DESIGNED SCC-LLC CONVERTER

| System Specification | |
|---|---|
| Input voltage | 250 V-430 V |
| Rated output voltage | 14 V |
| Maximum output current | 270 A |
| Maximum output power | 3900 W (1300 W × 3) |
| Circuit Parameter | |
| Transformer | N = 44, PQ35/35 core |
| Parallel inductor | $L_{p1}$ = 124.2 μH, |
|  | $L_{p2}$ = 125.2 μH, |
|  | $L_{p3}$ = 127.2 μH, PQ35/35 core |
| Series inductor | $L_{r1}$ = 25.7 μH, |
|  | $L_{r2}$ = 26.1 μH, |
|  | $L_{r3}$ = 26.1 μH, PQ32/20 core |
| Series capacitor | C1808C681JGGAC7800 2 KV, 680 pF × 5 |
| SCC capacitor | C2012NP02W472J125AA, 450 V, 4700 μF × 3 |
| Primary side switches | GS66508B (650 V, 30 A) |
| Secondary side switches | TPHR8504PL (40 V, 150 A) × 12 |
| SCC switches | IPB200N25N3 (250 V, 64 A) × 2 |
| Output capacitor | C3216JB1E336EM160AC, 25 V, 33 μF × 10 |
| Micro-controller | DSPIC33FJ32GS610 × 2 |

The prototype of the proposed LDC for EVs included the primary windings 142 of the transformers Tx1, Tx2 in the first phase had leakage inductances Lk of 6.15 μH and 5.41 μH, respectively; the primary windings 142 of the transformers Tx1, Tx2 in the second-phase had leakage inductances Lk of 6.00 μH and 5.65 μH, respectively; and the primary windings 142 of the transformers Tx1, Tx2 in the third-phase had leakage inductances Lk of 6.35 μH and 6.54 μH, respectively. There are differences among the three phase magnetic components, but the load current is balanced, and the circuit operates well.

Figure 10:
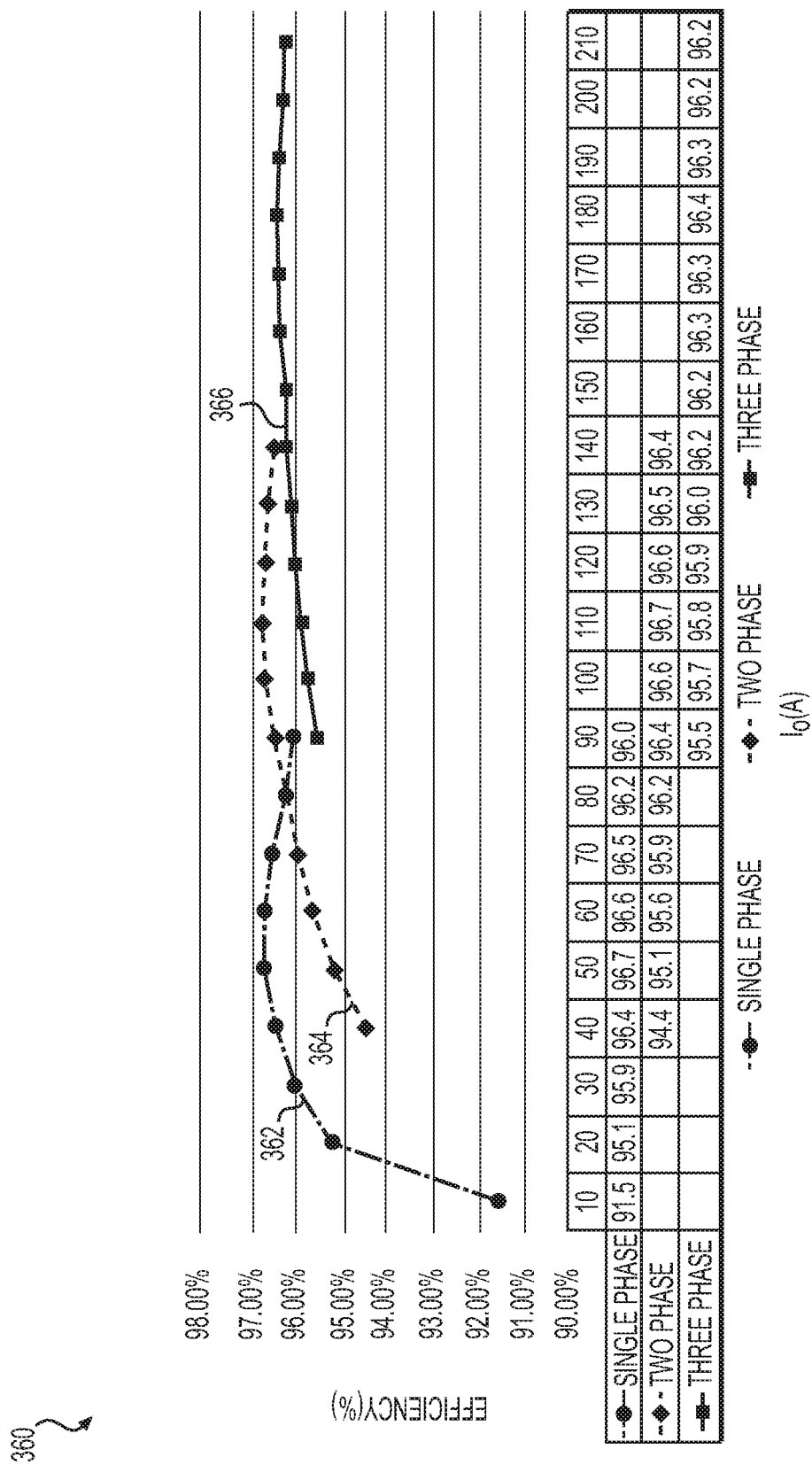
FIG. 10 is a graph showing plots of efficiency vs. output current of a multi phase LLC power converter in accordance with some embodiments of the present disclosure.

FIG. 10 is a graph 360 showing plots 362, 364, 366 of efficiency vs. output current of a multi-phase LLC power converter 100 in accordance with some embodiments of the present disclosure. Specifically, plot 362 shows the multi-phase LLC power converter 100 operating in a single-phase mode, with only one of the LLC phases 102, 104, 106

TABLE II

COMPARISON BETWEEN THE PROPOSED LDC AND OTHER REFERENCE DC-DC CONVERTERS

| | Specification of the Converter | | | | | | |
|---|---|---|---|---|---|---|---|
| Reference | Input voltage | Output voltage | Power | Peak efficiency | Full-load efficiency | Power density | Switching frequency |
| [1] | 200 V~400 V | 12 V | 1.2 kW | 95.5% | 90% | 0.5 kW/L | 100 kHz |
| [2] | 300 V | 12 V | 2 kW | 94% | 93.2% | — | 227 kHz~297 kHz |
| [3] | 235 V~431 V | 11.5 V~15 V | 2 kW | 93.5% | 93% | 0.94 kW/L | 200 kHz |
| [4] | 300 V~400 V | 12 V~16 V | 0.72 kW | 93.5% | 90% | — | 100 kHz |
| [5] | 250 V~400 V | 13 V~15 V | 1 kW | 93% | 92% | — | 100 kHz |
| [6] | 220 V~450 V | 6.5 V~16 V | 2.5 kW | 93.2% | 92% | 1.17 kW/L | 90 kHz~200 kHz |
| [7] | 260 V~430 V | 12.5 V~14.5 V | 1.9 kW | 93% | 91% | 1.02 kW/L | 65 kHz~150 kHz |
| [8] | 200 V~400 V | 12 V | 2 kW | 95.9% | 94.2% | — | 100 kHz~133 kHz |
| The proposed LDC | 250 V~430 V | 9 V~16 V | 3 kW | 96.7% | 96.2% | 3 kW/L | 260 kHz~400 kHz |

Experimental Results

To verify the effectiveness of designed three-phase SCC-LLC converter and the corresponding control strategy, a 250V-430V input 14V/270 A output prototype was built and tested. Table III shows system specifications and circuit parameters of the prototype.

operational. Plot 364 shows the multi-phase LLC power converter 100 operating in a two-phase mode, with two of the LLC phases 102, 104, 106 operational. Plot 366 shows the multi-phase LLC power converter 100 operating in a three-phase mode, with all three of the LLC phases 102, 104, 106 operational. FIG. 10 shows the efficiency of the proposed LDC. When the input voltage is 380V and output voltage is 14V, 96.2% efficiency is achieved at 210 A load current. Peak efficiency is 96.7%. When load current is light, the proposed LDC can run only one phase LLC dc-dc converter to reduce switching loss; when load current is medium, the proposed LDC can run two phase LLC dc-dc converters; when load current is high, the proposed LDC can run three phase LLC dc-dc converters to reduce conduction loss. As shown in FIG. 10, from 10 A to 80 A, 80 A to 150 A and 150 A to 210 A, one phase circuit, two phase circuit and three phase circuit are adopted. Thus, high efficiency can be achieved in all load ranges.

Figure 11A:
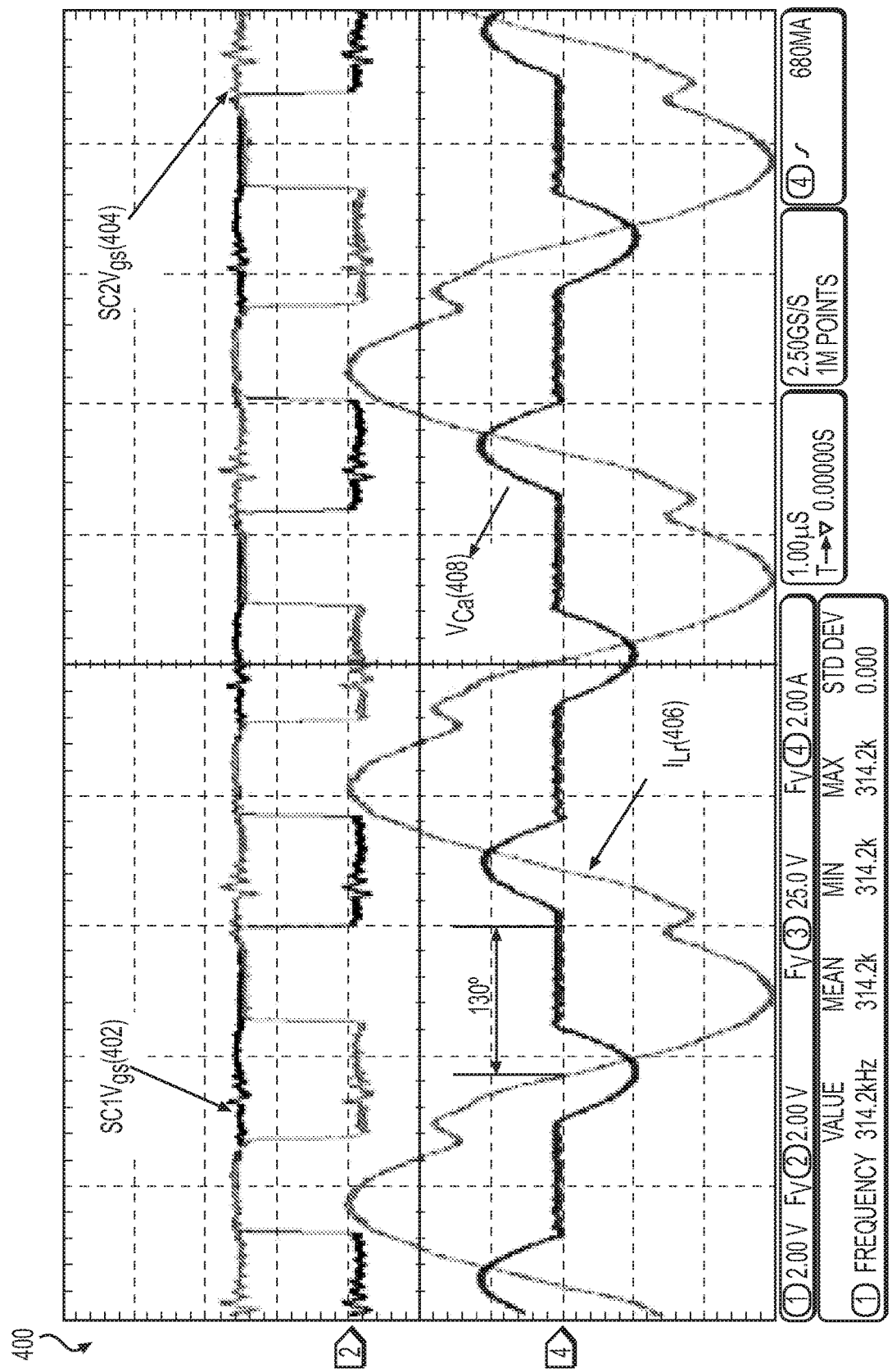
FIG. 11A is a graph showing plots of various parameters of a single-phase LLC power converter in accordance with some embodiments of the present disclosure.

FIG. 11A is a graph 400 showing plots 402, 404, 406, 408 of various parameters of a power converter using a single one of the LLC phases 102, 104, 106 in accordance with some embodiments of the present disclosure. Specifically, plot 402 shows a gate-source voltage Vgs of SC1 at 2V/div. plot 404 shows a gate-source voltage Vgs of SC2 at 2V/div; plot 406 shows primary-side current $I_{Lr}$ at 2 A/div; and plot 408 shows voltage $V_{Ca}$ across the switched capacitor Ca at 25V/div. FIG. 11A shows waveforms of one phase SCC-LLC resonant converter at 380V input, 14V/90 A output. The angle α is set to 130°. From FIG. 11A it can be seen that the SCC switches are turned on as soon as the capacitor voltage is discharged to zero. Thus, zero voltage switching is achieved. Moreover, the body diode BD is prevented from carrying current.

Figure 11B:
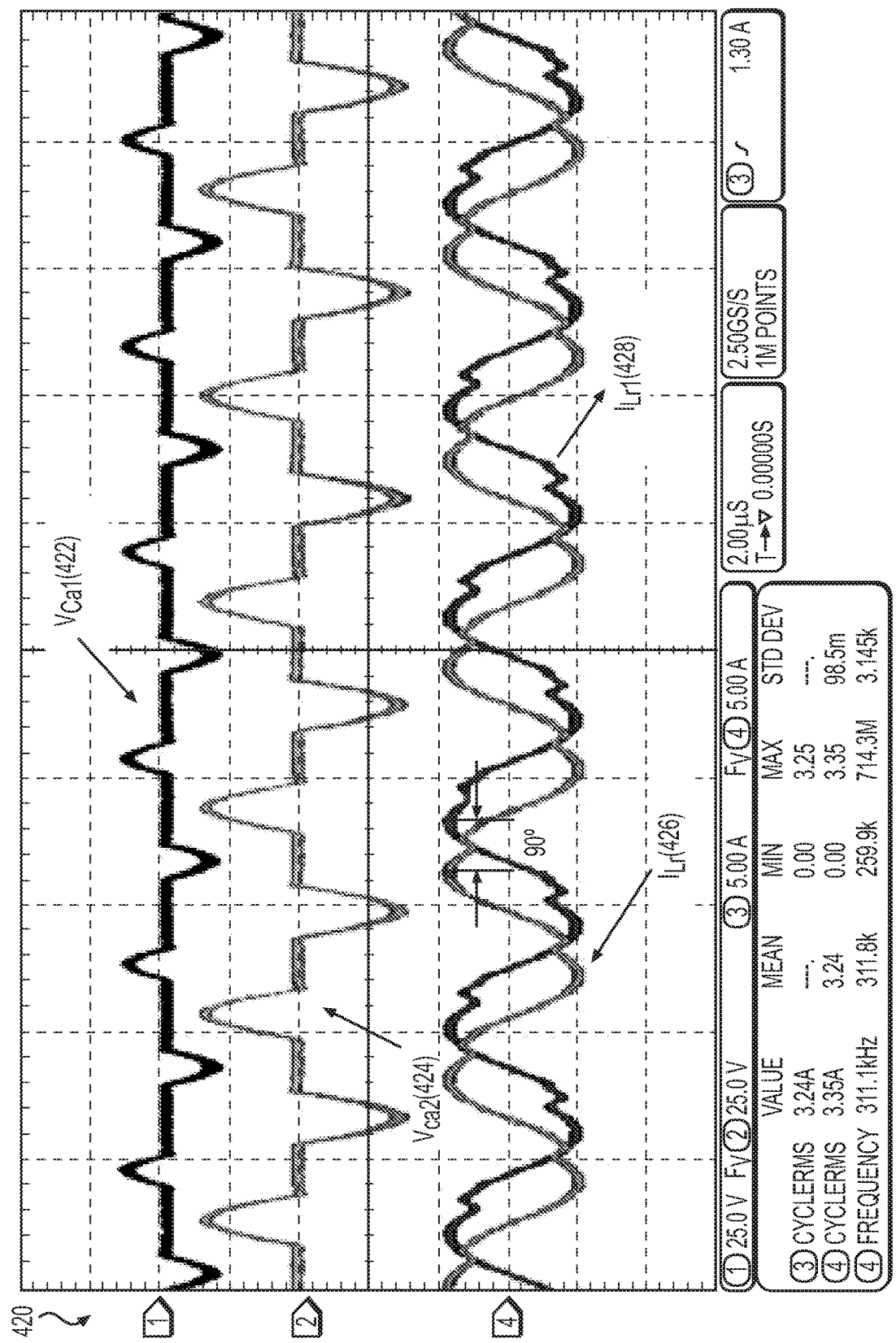
FIG. 11B is a graph showing plots of various parameters of a two-phase LLC power converter in accordance with some embodiments of the present disclosure.

FIG. 11B is a graph 420 showing plots 422, 424, 426, 428 of various parameters of a power converter using two LLC phases 102, 104, 106 in accordance with some embodiments of the present disclosure. Specifically, plot 422 shows a first-phase voltage $V_{Ca1}$ across the switched capacitor Ca1 in the first-phase converter 102 at 25V/div; plot 424 shows a second-phase voltage $V_{Ca2}$ across the switched capacitor Ca2 in the second-phase converter 104 at 25V/div; plot 426 shows the primary-side current $I_{Lr1}$ in the first-phase converter 102 at 5 A/div; and plot 428 shows the primary-side current $I_{Lr2}$ in the second-phase converter 104 at 5 A/div. FIG. 11B shows SCC capacitor voltages and primary-side currents of two-phase SCC-LLC resonant converter at 380V input, 14V/140 A output. The first phase is the reference phase and its SCC angle $α_1$ is fixed at 140°. The second phase angle $α_2$ is first set to 140°, and keeps decreasing to 125° for current sharing. The primary side gate driving signals of these two converters operate at 90° phase shift for current ripple cancellation.

Figure 12A:
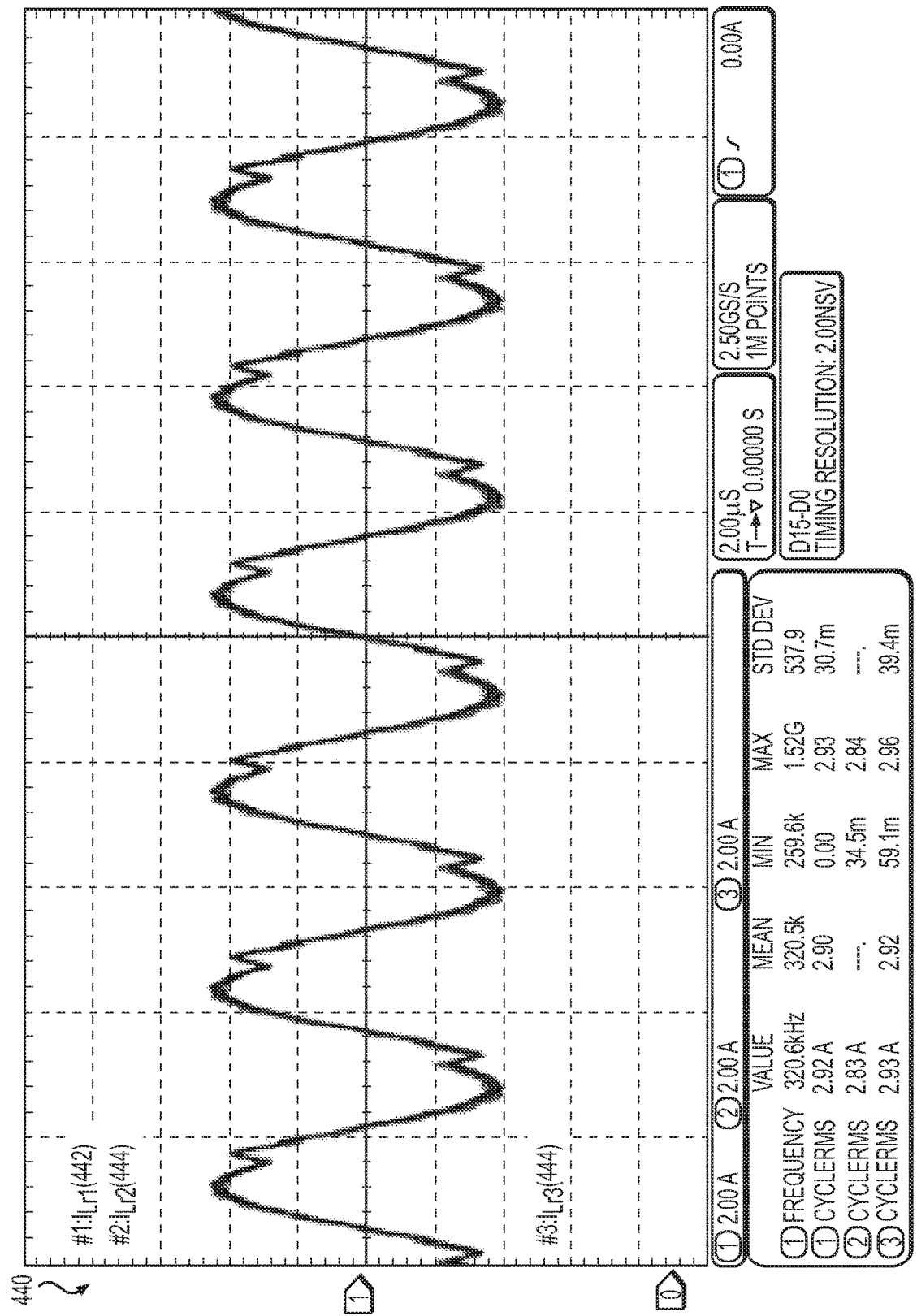
FIG. 12A is a graph showing plots of primary-side currents in a three-phase LLC power converter operating in a non-interleaving mode in accordance with the present disclosure.
Figure 12B:
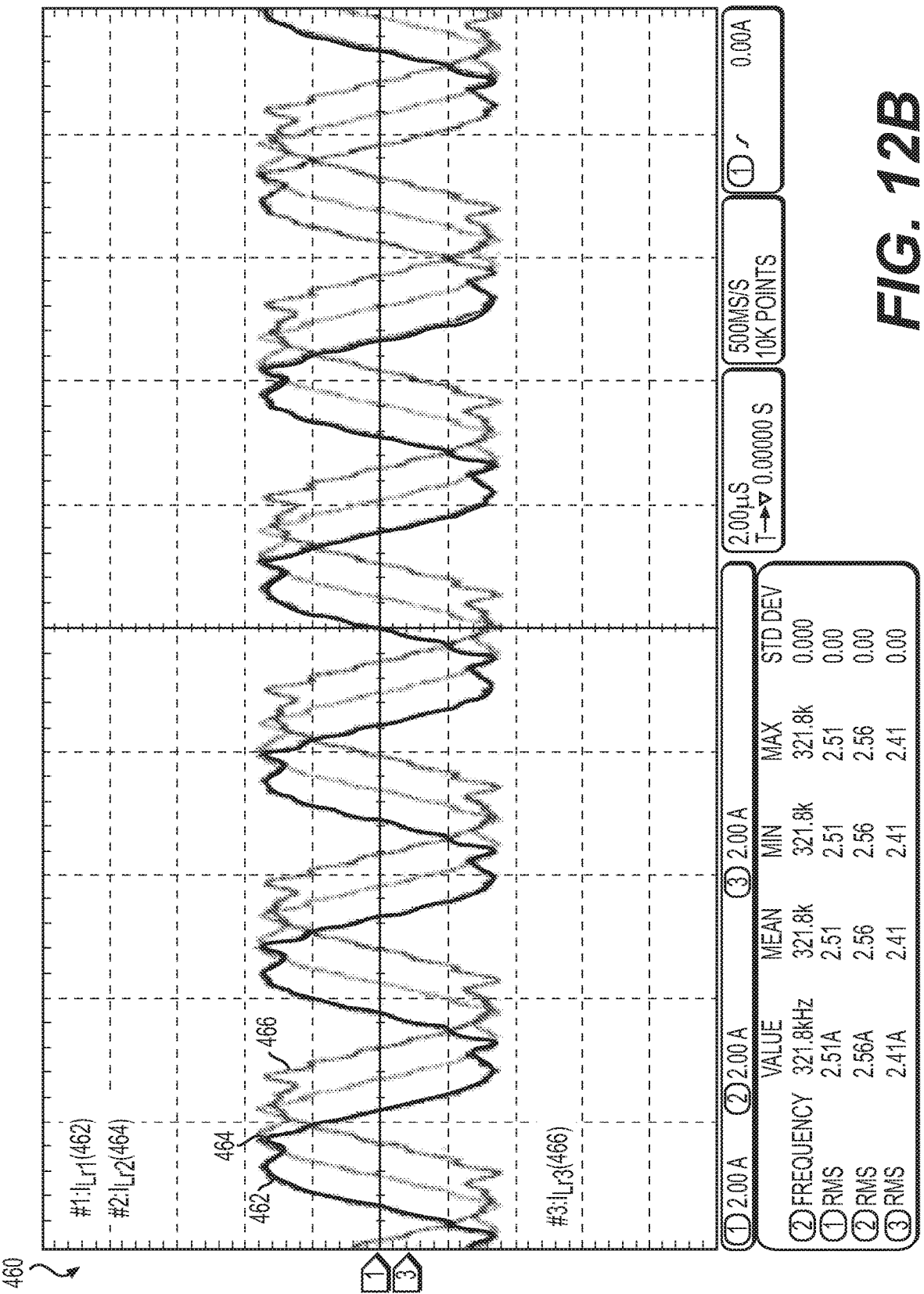
FIG. 12B is a graph showing plots of primary-side currents in a three-phase LLC power converter operating in an interleaving mode in accordance with the present disclosure.

FIG. 12A is a graph 440 showing plots 442, 444, 446 of primary-side currents $I_{Lr1}$, $I_{Lr2}$, $I_{Lr3}$, respectively, in a three-phase LLC power converter 100 operating in a non-interleaving mode at 2 A/div. FIG. 12A shows primary-side current of three-phase SCC-LLC converter at 380V input, 14V/180 A output without interleaving. The first phase is also viewed as the reference phase and $α_1$ is set to 140°. By adjusting $α_2$ and $α_3$ of the second phase and third phase using the proposed control method, current sharing is achieved. FIG. 12B is a graph 460 showing plots 462, 464, 466 of primary-side currents $I_{Lr1}$, $I_{Lr2}$, $I_{Lr3}$, respectively, in a three-phase LLC power converter 100 operating in an interleaving mode at 2 A/div. FIG. 12B shows the primary-side current at 380V input, 14 A/160 A output with 0°, 60° and 120° interleaving.

Figure 13A:
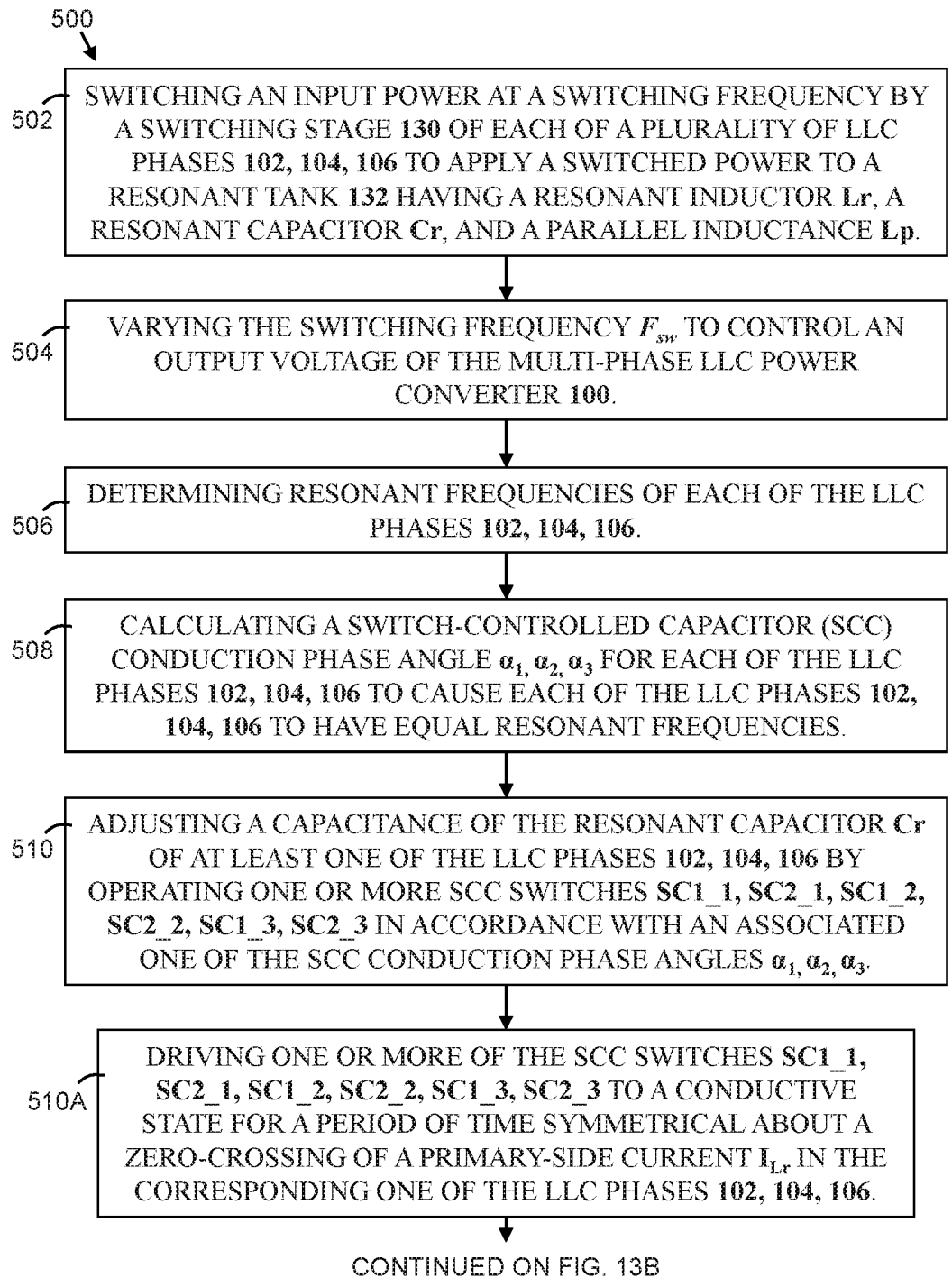
FIGS. 13A-13B show a flow chart of steps in a method of operating a multi phase LLC power converter in accordance with some embodiments of the present disclosure.
Figure 13B:
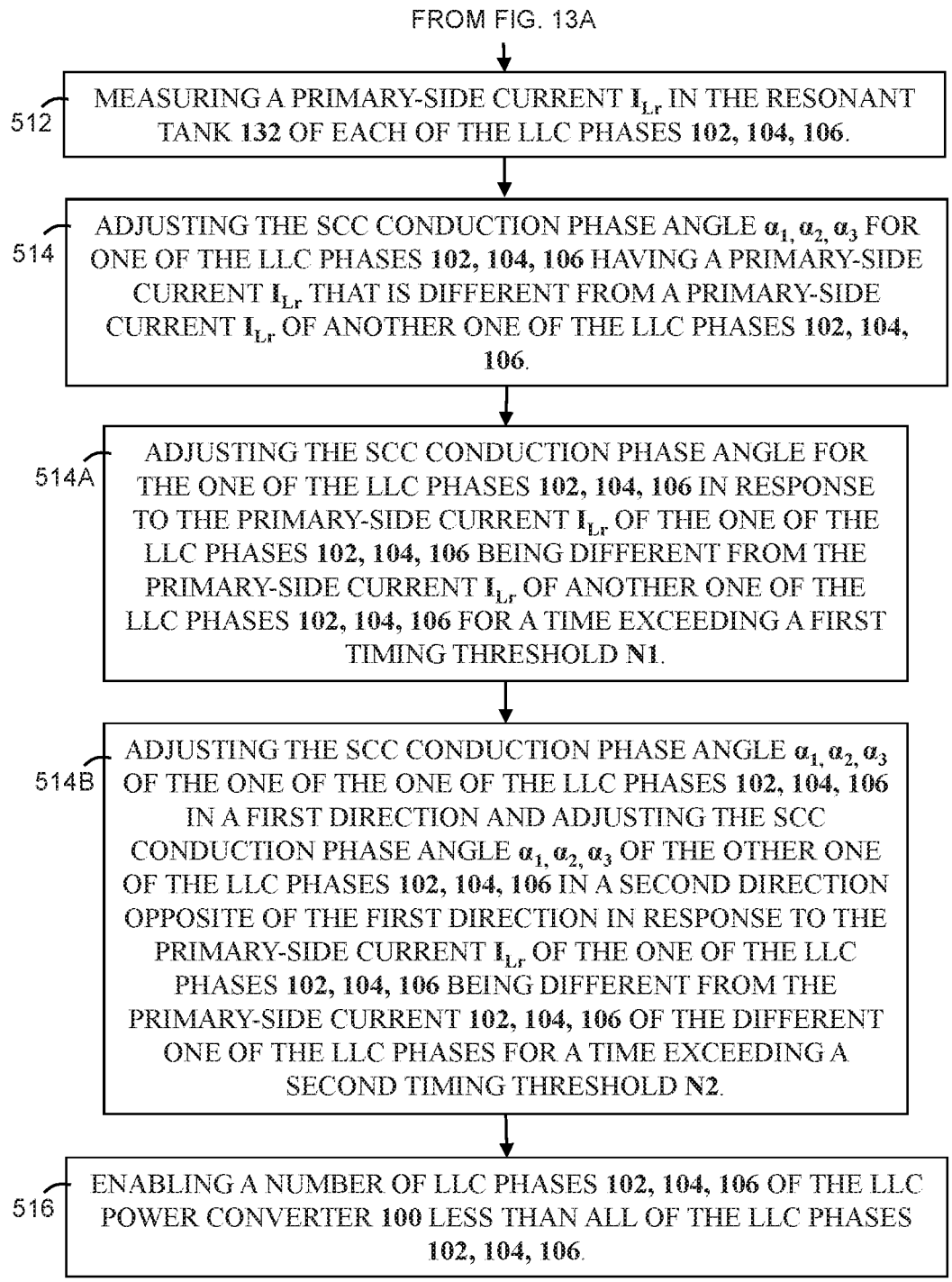

A method 500 of operating a multi-phase LLC power converter 100 is shown in the flow chart of FIGS. 13A-13B. The method 500 includes switching an input power at a switching frequency by a switching stage 130 of each of a plurality of LLC phases 102, 104, 106 to apply a switched power to a resonant tank 132 having a resonant inductor Lr, a resonant capacitor Cr, and a parallel inductance Lp at step 502. The switched power approximates an alternating current (AC) waveform having a switching frequency $f_{sw}$, also called an AC frequency.

The method 500 also includes varying the switching frequency $f_{sw}$ to control an output voltage of the multi-phase LLC power converter 100 at step 504. The switching frequency $f_{sw}$, may also be called an AC frequency or an AC switching frequency. In some embodiments, the switching frequency $f_{sw}$ exceeds 300 kHz. In some embodiments, the switching frequency $f_{sw}$ may be varied between 260 and 400 kHz. In some other embodiments, the switching frequency $f_{sw}$ may be varied between 260 and 380 kHz. In some embodiments, the high-speed switches Q1, Q2, Q3, Q4, may be switched at an operating frequency range of between 260 and 380 kHz.

The method 500 also includes determining resonant frequencies of each of the LLC phases 102, 104, 106 at step 506. This step 506 may be performed indirectly by measuring one or more values that correspond to the resonant frequencies, such as primary-side currents $I_{Lr1}$, $I_{Lr2}$, $I_{Lr3}$. This step 506 may be performed experimentally, for example by varying the $f_{sw}$ and monitoring one or more resulting values.

The method 500 also includes calculating a switch-controlled capacitor (SCC) conduction phase angle $α_1$, $α_2$, $α_3$ for each of the LLC phases 102, 104, 106 to cause each of the LLC phases 102, 104, 106 to have equal resonant frequencies at step 508.

The method 500 also includes adjusting a capacitance of the resonant capacitor Cr of at least one of the plurality of LLC phases 102, 104, 106 by operating one or more SCC switches SC1_1, SC2_1, SC1_2, SC2_2, SC1_3, SC2_3 in accordance with an associated one of the SCC conduction phase angles $α_1$, $α_2$, $α_3$ at step 510. The SCC switches SC1_1, SC2_1 of the first LLC phase 102 are operated using the first SCC conduction phase angle $α_1$. Likewise, the SCC switches SC1_2, SC2_2 of the second LLC phase 104 are operated using the second SCC conduction phase angle $α_2$. Likewise, the SCC switches SC1_3, SC2_3 of the third LLC phase 106 are operated using the third SCC conduction phase angle $α_3$.

In some embodiments, step 510 of operating the one or more SCC switches SC1_1, SC2_1, SC1_2, SC2_2, SC1_3, SC2_3 in accordance with the associated SCC conduction phase angle $α_1$, $α_2$, $α_3$ further comprises driving one or more of the SCC switches SC1_1, SC2_1, SC1_2, SC2_2, SC1_3, SC2_3 to a conductive state for a period of time symmetrical about a zero-crossing of a primary-side current $I_{Lr}$ in the corresponding one of the LLC phases 102, 104, 106 at sub-step 510A.

The method 500 may also include measuring a primary-side current $I_{Lr}$ in the resonant tank 132 of each of the LLC phases 102, 104, 106 at step 512.

The method 500 may also include adjusting the SCC conduction phase angle $α_1$, $α_2$, $α_3$ for one of the LLC phases 102, 104, 106 having a primary-side current $I_{Lr}$ that is different from a primary-side current $I_{Lr}$ of another one of the LLC phases 102, 104, 106 at step 514.

Step 514 of adjusting the SCC conduction phase angle $α_1$, $α_2$, $α_3$ may comprise adjusting the SCC conduction phase angle $α_1$, $α_2$, $α_3$ for the one of the LLC phases 102, 104, 106 in response to the primary-side current $I_{Lr}$ of the one of the LLC phases 102, 104, 106 being different from the primary-side current $I_{Lr}$ of another one of the LLC phases 102, 104, 106 for a time exceeding a first timing threshold N1 at sub-step 514A. This sub-step 514A is described in more detail with reference to method 600 and FIG. 14.

Step 514 of adjusting the SCC conduction phase angle $\alpha_1$, $\alpha_2$, $\alpha_3$ may comprise adjusting the SCC conduction phase angle $\alpha_1$, $\alpha_2$, $\alpha_3$ of the one of the one of the LLC phases 102, 104, 106 in a first direction and adjusting the SCC conduction phase angle $\alpha_1$, $\alpha_2$, $\alpha_3$ of the other one of the LLC phases 102, 104, 106 in a second direction opposite of the first direction in response to the primary-side current $I_{Lr}$ of the one of the LLC phases 102, 104, 106 being different from the primary-side current 102, 104, 106 of the different one of the LLC phases for a time exceeding a second timing threshold N2 at sub-step 514B. For example, the second SCC conduction phase angle $\alpha_2$ of the second LLC phase 104 may be increased by a predetermined amount, and the third SCC conduction phase angle $\alpha_3$ of the third LLC phase 106 may be simultaneously decreased by the predetermined amount.

The method 500 may also include enabling a number of LLC phases 102, 104, 106 of the LLC power converter 100 less than all of the LLC phases 102, 104, 106 at step 516. This may be called phase shedding. A controller may enable only as many of the LLC phases enabled 102, 104, 106 as are needed to satisfy an output current requirement of the multi-phase LLC power converter 100. Satisfying the output current requirement may include generating an output current that meets the demand of a load 122. Alternatively or additionally, satisfying the output current requirement may include operating the LLC power converter 100 with number of LLC phases 102, 104, 106 causing the LLC power converter 100 to operate with a highest efficiency. For example, and with reference to FIG. 10, the LLC power converter 100 can be operated with either of one or two LLC phases to produce an output current of 60 A, but one phase operation is more efficient for the output current of 60 A.

Figure 14:
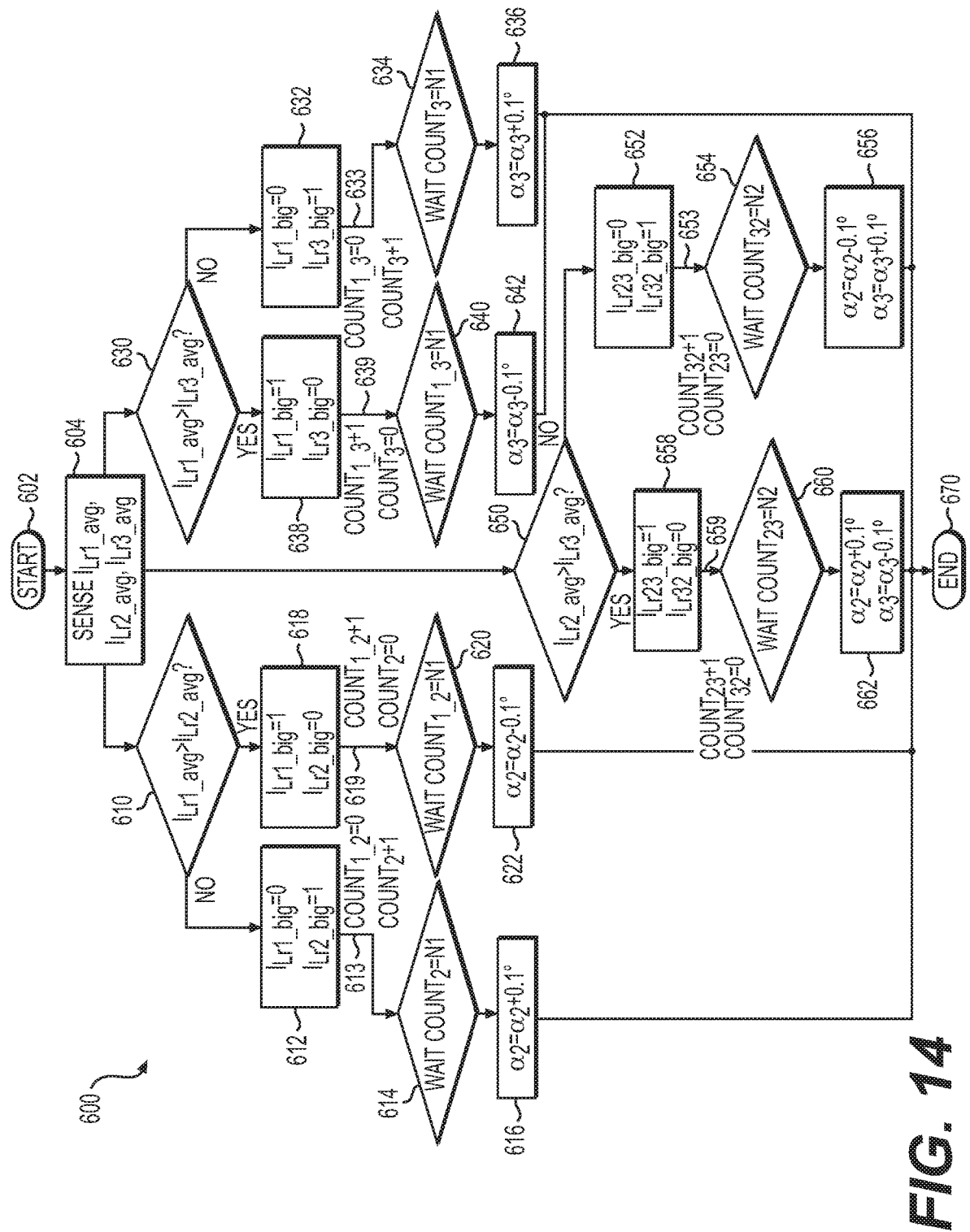
FIG. 14 shows a flow chart of steps in a method of computing adjusted SCC conduction phase angles in accordance with some embodiments of the present disclosure.

FIG. 14 shows a flow chart of steps in a method 600 of computing adjusted SCC conduction phase angles in accordance with some embodiments of the present disclosure. The method 600 may be performed by a controller, such as the primary-side controller 240. The method 600 may be run in a continuous loop. Alternatively or additionally, the method 600 may be run on a periodic basis, for example at predetermined time intervals. The method 600 starts at step 602.

The method 600 includes sensing averaged current signals ILr1_avg, ILr2_avg, ILr3_avg at step 604. This step 604 may be performed using hardware and/or software processing of the primary-side current signals ILr1, ILr2, ILr3.

The method 600 includes comparing the averaged first current ILr1_avg with the averaged second current ILr2_avg to determine if the averaged first current ILr1_avg is greater than the averaged second current ILr2_avg at step 610. If the averaged first current ILr1_avg is not greater than the averaged second current ILr2_avg, as determined at step 610, then the method 600 proceeds with clearing flag ILr1_big by setting ILr1_big=0 and setting flag ILr2_big by setting ILr2_big=1 at step 612.

If the averaged first current ILr1_avg is not greater than the averaged second current ILr2_avg, as determined at step 610, then the method 600 also proceeds with resetting a first counter COUNT$_{1\_2}$ by setting first counter COUNT$_{1\_2}$=0 and incrementing a second counter COUNT$_2$ at step 613. If the averaged first current ILr1_avg is not greater than the averaged second current ILr2_avg, as determined at step 610, then the method 600 also proceeds with waiting until the second counter COUNT$_2$ exceeds a first timing threshold N1 at step 614.

If the averaged first current ILr1_avg is not greater than the averaged second current ILr2_avg, as determined at step 610, and the second counter COUNT$_2$ exceeds the first timing threshold N1, as determined at step 614 then the method 600 also proceeds with adjusting a second conduction phase angle $\alpha_2$ by adding a predetermined adjustment amount $\Delta\alpha$ at step 616. The predetermined adjustment amount $\Delta\alpha$ may be +0.1°, although the predetermined adjustment amount $\Delta\alpha$ may be greater than or less than 0.1°. The method 600 may then end by proceeding with step 670.

If the averaged first current ILr1_avg is greater than the averaged second current ILr2_avg, as determined at step 610, then the method 600 proceeds with setting flag ILr1_big by setting ILr1_big=1 and clearing flag ILr2_big by setting ILr2_big=0 at step 618. If the averaged first current ILr1_avg is greater than the averaged second current ILr2_avg, as determined at step 610, then the method 600 also proceeds with incrementing the first counter COUNT$_{1\_2}$ and resetting the second counter COUNT$_2$ by setting COUNT$_2$=0 at step 619.

If the averaged first current ILr1_avg is greater than the averaged second current ILr2_avg, as determined at step 610, then the method 600 also proceeds with waiting until the first counter COUNT$_{1\_2}$ exceeds the first timing threshold N1 at step 620. If the averaged first current ILr1_avg is greater than the averaged second current ILr2_avg, as determined at step 610, and the first counter COUNT$_{1\_2}$ exceeds the first timing threshold N1, as determined at step 620 then the method 600 also proceeds with adjusting the second conduction phase angle $\alpha_2$ by subtracting the predetermined adjustment amount $\Delta\alpha$ at step 622. The predetermined adjustment amount $\Delta\alpha$ may be 0.1°, although the predetermined adjustment amount $\Delta\alpha$ may be greater than or less than 0.1°. The method 600 may then end by proceeding with step 670.

The method 600 also includes comparing the averaged first current ILr1_avg with the averaged third current ILr3_avg to determine if the averaged first current ILr1_avg is greater than the averaged third current ILr23_avg at step 630. If the averaged first current ILr1_avg is not greater than the averaged third current ILr3_avg, as determined at step 630, then the method 600 proceeds with clearing flag ILr1_big by setting ILr1_big=0 and setting flag ILr3_big by setting ILr3_big=1 at step 632.

If the averaged first current ILr1_avg is not greater than the averaged third current ILr3_avg, as determined at step 630, then the method 600 also proceeds with resetting a third counter COUNT$_{1\_3}$ by setting third counter COUNT$_{1\_3}$=0 and incrementing a fourth counter COUNT$_3$ at step 633. If the averaged first current ILr1_avg is not greater than the averaged third current ILr3_avg, as determined at step 630, then the method 600 also proceeds with waiting until the fourth counter COUNT$_4$ exceeds the first timing threshold N1 at step 634.

If the averaged first current ILr1_avg is not greater than the averaged third current ILr3_avg, as determined at step 630, and the fourth counter COUNT$_3$ exceeds the first timing threshold N1, as determined at step 634 then the method 600 also proceeds with adjusting a third conduction phase angle $\alpha_3$ by adding the predetermined adjustment amount $\Delta\alpha$ at step 636. The predetermined adjustment amount $\Delta\alpha$ may be +0.1°, although the predetermined adjustment amount $\Delta\alpha$ may be greater than or less than 0.1°. The method 600 may then end by proceeding with step 670.

If the averaged first current ILr1_avg is greater than the averaged third current ILr3_avg, as determined at step 630, then the method 600 proceeds with setting flag ILr1_big by setting ILr1_big=1 and clearing flag ILr3_big by setting ILr3_big=0 at step 638. If the averaged first current ILr1_avg is greater than the averaged third current ILr3_avg, as determined at step 630, then the method 600 also proceeds with incrementing the third counter $COUNT_{1\_3}$ and resetting the fourth counter $COUNT_3$ by setting $COUNT_3=0$ at step 639.

If the averaged first current ILr1_avg is greater than the averaged third current ILr3_avg, as determined at step 630, then the method 600 also proceeds with waiting until the third counter $COUNT_{1\_3}$ exceeds the first timing threshold N1 at step 640.

If the averaged first current ILr1_avg is greater than the averaged third current ILr3_avg, as determined at step 630, and the third counter $COUNT_{1\_3}$ exceeds the first timing threshold N1, as determined at step 640, then the method 600 also proceeds with adjusting the third conduction phase angle $\alpha_3$ by subtracting the predetermined adjustment amount $\Delta\alpha$ at step 642. The predetermined adjustment amount $\Delta\alpha$ may be +0.1°, although the predetermined adjustment amount $\Delta\alpha$ may be greater than or less than 0.1°. The method 600 may then end by proceeding with step 670.

The method 600 includes comparing the averaged second current ILr2_avg with the averaged third current ILr3_avg to determine if the averaged second current ILr2_avg is greater than the averaged third current ILr3_avg at step 650. If the averaged second current ILr2_avg is not greater than the averaged third current ILr3_avg, as determined at step 650, then the method 600 proceeds with clearing flag ILr23_big by setting ILr23_big=0 and setting flag ILr32_big by setting ILr32_big=1 at step 652.

If the averaged first current ILr1_avg is not greater than the averaged third current ILr3_avg, as determined at step 650, then the method 600 also proceeds with incrementing a fifth counter $COUNT_{32}$ and resetting a sixth counter $COUNT_{23}$ by setting $COUNT_{23}=0$ at step 653. If the averaged second current ILr2_avg is not greater than the averaged third current ILr3_avg, as determined at step 650, then the method 600 also proceeds with waiting until the sixth counter $COUNT_{32}$ exceeds a second timing threshold N2 at step 654.

If the averaged second current ILr2_avg is not greater than the averaged third current ILr3_avg, as determined at step 650, and the sixth counter $COUNT_{32}$ exceeds the second timing threshold N2, as determined at step 654 then the method 600 also proceeds with adjusting the second conduction phase angle $\alpha_2$ by subtracting the predetermined adjustment amount $\Delta\alpha$, and adjusting the third conduction phase angle $\alpha_3$ by adding the predetermined adjustment amount $\Delta\alpha$ at step 656. The predetermined adjustment amount $\Delta\alpha$ may be +0.1°, although the predetermined adjustment amount $\Delta\alpha$ may be greater than or less than 0.1°. The method 600 may then end by proceeding with step 670.

If the averaged second current ILr2_avg is greater than the averaged third current ILr3_avg, as determined at step 650, then the method 600 proceeds with setting flag ILr23_big by setting ILr23_big=1 and clearing flag ILr32_big by setting ILr32_big=0 at step 658. If the averaged second current ILr2_avg is greater than the averaged third current ILr3_avg, as determined at step 650, then the method 600 also proceeds with incrementing the sixth counter $COUNT_{23}$ and resetting the fifth counter $COUNT_{32}$ by setting $COUNT_{32}=0$ at step 659.

If the averaged second current ILr2_avg is greater than the averaged third current ILr3_avg, as determined at step 650, then the method 600 also proceeds with waiting until the sixth counter $COUNT_{23}$ exceeds the second timing threshold N2 at step 660.

If the averaged second current ILr2_avg is greater than the averaged third current ILr3_avg, as determined at step 650, and the sixth counter $COUNT_{23}$ exceeds the second timing threshold N2, as determined at step 660, then the method 600 also proceeds with adjusting the second conduction phase angle $\alpha_2$ by adding the predetermined adjustment amount $\Delta\alpha$, and adjusting the third conduction phase angle $\alpha_3$ by subtracting the predetermined adjustment amount $\Delta\alpha$ at step 662. The predetermined adjustment amount $\Delta\alpha$ may be +0.1°, although the predetermined adjustment amount $\Delta\alpha$ may be greater than or less than 0.1°. The method 600 may then end by proceeding with step 670.

CONCLUSION

Variable switching frequency and full-wave SCC are applied together in a three-phase LLC resonant converters. Frequency modulation is used for output voltage regulation over wide input/output variations. An adaptive hysteresis comparison control scheme is used to balance current among three converters. The control method could filter out any unexpected noise on current sensing. Low-cost MCUs may be used to implement the control strategy. The present disclosure includes an analysis of load sharing characteristics of an LLC converter. The digital implementations of both output voltage control and current sharing control are provided. A 250V-430V input, 14V/270 A output, three-phase SCC-LLC prototype is built and tested. Experimental results show that good current sharing performance can be achieved.

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of operating a multi-phase LLC power converter comprising:
switching an input power at a switching frequency by a switching stage of each of a plurality of LLC phases to apply a switched power to a resonant tank having a resonant inductor, a resonant capacitor, and a parallel inductance, the switched power approximating an alternating current (AC) waveform having a switching frequency;
varying the switching frequency to control an output voltage of the multi-phase LLC power converter;
calculating a switch-controlled capacitor (SCC) conduction phase angle for each of the LLC phases to cause each of the LLC phases to have equal resonant frequencies; [and] adjusting a capacitance of the resonant capacitor of at least one of the plurality of LLC phases by operating an SCC switch in accordance with an associated one of the SCC conduction phase angles;
measuring a primary-side current in the resonant tank of each of the LLC phases; and
adjusting the SCC conduction phase angle for one of the LLC phases having a primary-side current that is different from a primary-side current of another one of the LLC phases, wherein adjusting the SCC conduction phase angle for the one of the LLC phases having the primary-side current that is different from the primary-side current of a different one of the LLC phases further comprises at least one of:
adjusting the SCC conduction phase angle for the one of the LLC phases in response to the primary-side current of the one of the LLC phases being different from the primary-side current of another one of the LLC phases for a time exceeding a first timing threshold; or
adjusting the one of the one of the LLC phases in a first direction and adjusting the other one of the LLC phases in a second direction opposite of the first direction in response to the primary-side current of the one of the LLC phases being different from the primary-side current of the different one of the LLC phases for a time exceeding a second timing threshold.

2. The method of claim 1, wherein operating the SCC switch in accordance with the associated one of the SCC conduction phase angles further comprises driving the SCC switch to a conductive state for a period of time symmetrical about a zero-crossing of a primary-side current in the at least one of the plurality of LLC phases.

3. The method of claim 1, further comprising enabling a number of LLC phases of the LLC power converter, with the number of LLC phases enabled being only as many as are needed to satisfy an output current of the multi-phase LLC power converter.

4. A multi-phase LLC power converter comprising:
a plurality of LLC phases, each of the LLC phases comprising a resonant tank and a switching stage, the resonant tank including a resonant inductor, a resonant capacitor, and a parallel inductance, and the switching stage configured to switch an input power at an operating frequency to apply a switched power to the resonant tank, the switched power approximating an alternating current (AC) waveform having a switching frequency,
a secondary-side controller configured to vary the switching frequency to control an output voltage of the multi-phase LLC power converter; and
a primary-side controller configured to:
calculate an initial switch-controlled capacitor (SCC) conduction phase angle for each of the LLC phases to cause each of the LLC phases to have equal resonant frequencies;
operate an SCC switch in accordance with an associated one of the SCC conduction phase angles to adjust the capacitance of the resonant capacitor of at least one of the plurality of LLC phases;
measure a primary-side current in the resonant tank of each of the LLC phases; and
adjust the SCC conduction phase angle for one of the LLC phases having a primary-side current that is different from a primary-side current of another one of the LLC phases,
wherein adjusting the SCC conduction phase angle for the one of the LLC phases having the primary-side current that is different from the primary-side current of a different one of the LLC phases further comprises at least one of:
adjusting the SCC conduction phase angle for the one of the LLC phases in response to the primary-side current of the one of the LLC phases being different from the primary-side current of another one of the LLC phases for a time exceeding a first timing threshold; or
adjusting the one of the one of the LLC phases in a first direction and adjusting the other one of the LLC phases in a second direction opposite of the first direction in response to the primary-side current of the one of the LLC phases being different from the primary-side current of the different one of the LLC phases for a time exceeding a second timing threshold.

5. The power converter of claim 4, wherein operating the SCC switch in accordance with the associated one of the SCC conduction phase angles includes driving the SCC switch to a conductive state for a period of time symmetrical about a zero-crossing of a primary-side current in the at least one of the plurality of LLC phases.

6. The power converter of claim 4, wherein the switching stage of each of the plurality of LLC phases comprises one or more Gallium Nitride (GaN) high-electron-mobility transistors (HEMTs); and
wherein the switching frequency exceeds 300 kHz.

7. A low-voltage DC-DC converter (LDC) for an electrified vehicle comprising the power converter of claim 4.

8. The power converter of claim 4, wherein the power converter has a peak efficiency of at least 96.7% or a full-load efficiency of at least 96.2%.

9. The power converter of claim 4, wherein the power converter has power density of at least about 3 kW/L.

10. The low-voltage DC-DC converter of claim 7, wherein the low-voltage DC-DC converter is configured to supply output voltage of 9.0 to 16.0 VDC from the input power of 250 to 430 VDC.

11. A multi-phase LLC power converter comprising:
- two LLC phases, each of the two LLC phases comprising a resonant tank and a switching stage, the resonant tank including a resonant inductor, a resonant capacitor, and a parallel inductance, and the switching stage configured to switch an input power at an operating frequency to apply a switched power to the resonant tank, the switched power approximating an alternating current (AC) waveform having a switching frequency,
- a secondary-side controller configured to vary the switching frequency to control an output voltage of the multi-phase LLC power converter; and
- a primary-side controller configured to: operate a switch-controlled capacitor (SCC) switch in accordance with an associated one of the SCC conduction phase angles to adjust the capacitance of the resonant capacitor of at least one of the two LLC phases;
- wherein one of the two LLC phases is a reference phase having a fixed SCC conduction phase angle, and wherein the primary-side controller is configured to calculate an SCC conduction phase angle for the other one of the two LLC phases to cause each of the two LLC phases to have equal currents therethrough; and
- wherein the SCC conduction phase angle for the other one of the two LLC phases has an initial value matching the fixed SCC conduction phase angle of the one of the two LLC phases, and wherein the primary-side controller is further configured to decrease the SCC conduction phase angle for the other one of the two LLC phases below the fixed SCC conduction phase angle of the one of the two LLC phases to cause each of the two LLC phases to have equal currents therethrough.

12. The multi-phase LLC power converter of claim 11, wherein the switched power of each of the two LLC phases is 90-degrees out of phase with one-another.

13. The multi-phase LLC power converter of claim 11, wherein the fixed SCC conduction phase angle of the one of the two LLC phases has a phase angle of 140 degrees.

* * * * *